(12) United States Patent
Free

(10) Patent No.: US 8,312,827 B1
(45) Date of Patent: Nov. 20, 2012

(54) INTER/PRE-CURED LAYER/PRE-CURED EMBROIDERED COMPOSITE LAMINATE AND METHOD OF PRODUCING SAME

(76) Inventor: James J Free, Elkhart, IN (US)

( * ) Notice: Subject to any disclaimer, the term of this patent is extended or adjusted under 35 U.S.C. 154(b) by 816 days.

(21) Appl. No.: 12/008,121

(22) Filed: Jan. 8, 2008

Related U.S. Application Data

(60) Provisional application No. 60/879,105, filed on Jan. 8, 2007.

(51) Int. Cl.
*D05B 93/00* (2006.01)
*B32B 9/00* (2006.01)

(52) U.S. Cl. .................. 112/475.08; 428/102

(58) Field of Classification Search ............ 112/402, 112/406, 420, 163, 475.08, 475.17; 428/102, 428/113, 292.1
See application file for complete search history.

(56) References Cited

U.S. PATENT DOCUMENTS

| | | | | |
|---|---|---|---|---|
| 4,469,541 | A * | 9/1984 | Goldsworthy | 156/180 |
| 4,938,824 | A * | 7/1990 | Youngkeit | 156/173 |
| 6,599,610 | B2 * | 7/2003 | Homma et al. | 428/102 |
| 6,932,116 | B2 * | 8/2005 | Smith et al. | 138/98 |
| 7,192,634 | B2 * | 3/2007 | Carter et al. | 428/113 |
| 2004/0137208 | A1 * | 7/2004 | Mitani et al. | 428/292.1 |
| 2005/0070183 | A1 * | 3/2005 | Dunn et al. | 442/59 |

* cited by examiner

*Primary Examiner* — Ismael Izaguirre

(57) ABSTRACT

Methods of pre-cured (wet-out) composite lay up, are improved upon by embroidering, sewing, stitching, bundle-wrapping, tying, etc., substantially between layers and substantially normal, or in the "Z-direction" to the lay up with a wet or pre-cured fiber bundle or tow. The pre-cured tow is embroidered, etc. either in with a like, homogeneous wet to wet layering or a heterogeneous non-similar layering, between double or multiple layers. Heterogeneous examples include differing material types among layers, laying and embroidering in objects or voids, as well as wet-laminating/sewing in with an already-dry (set/cured) layer.

15 Claims, 16 Drawing Sheets

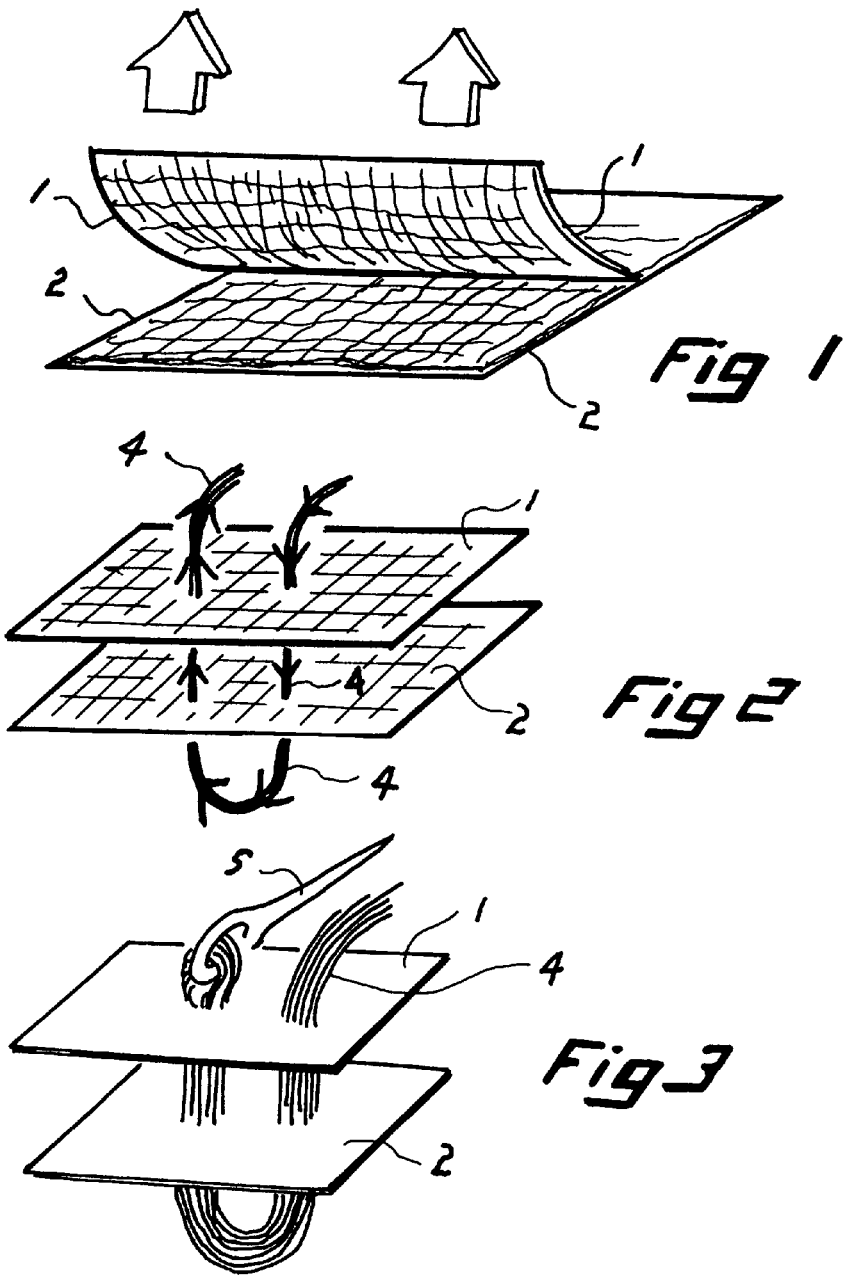

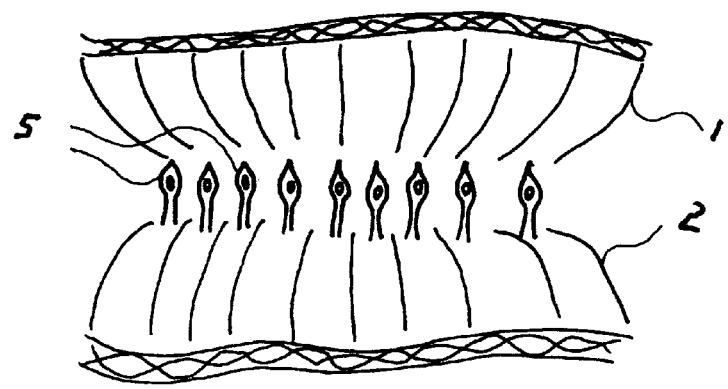
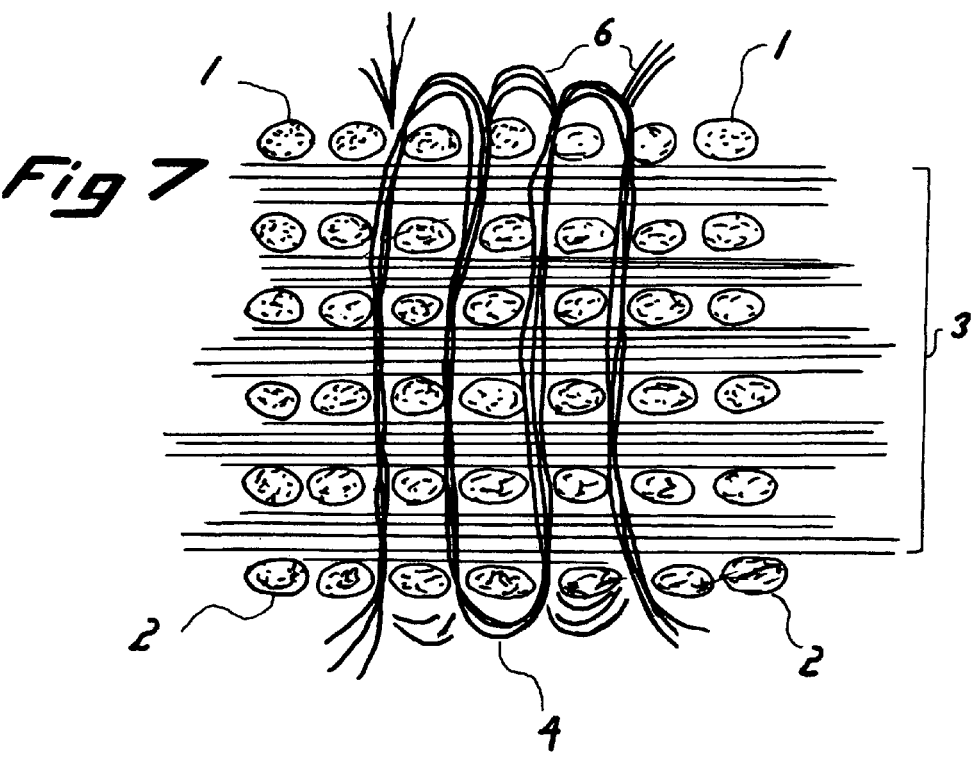

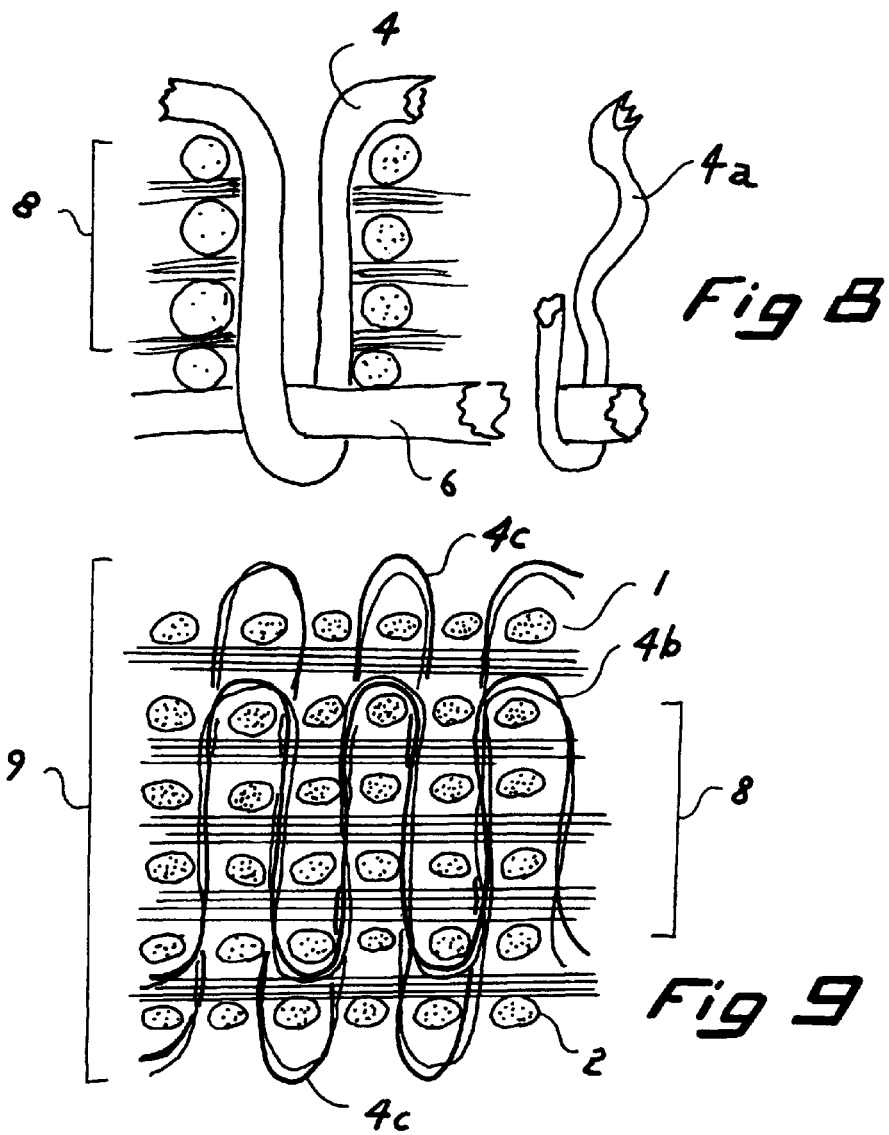

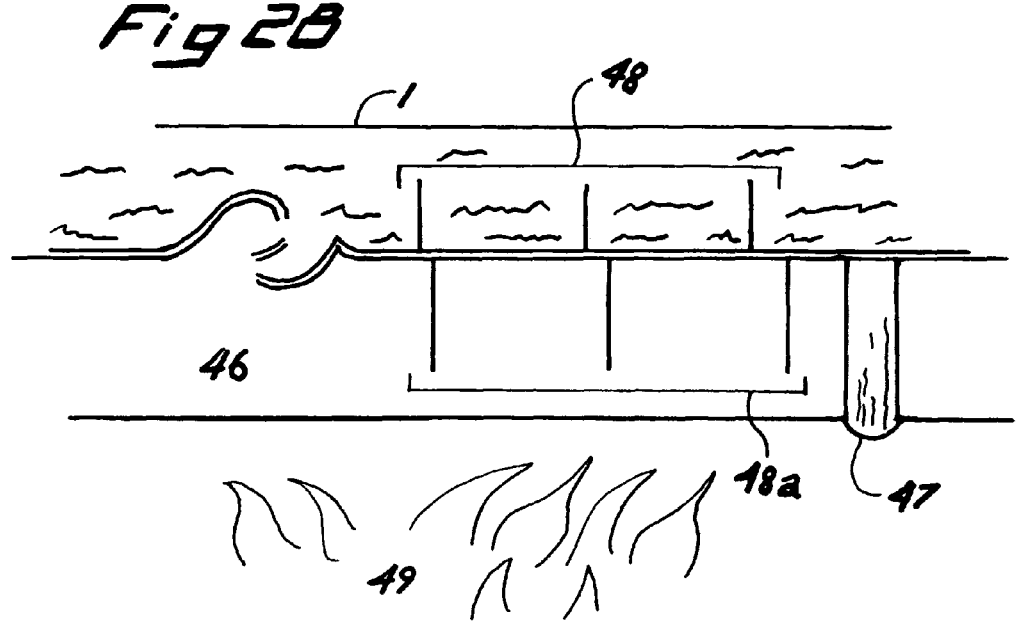
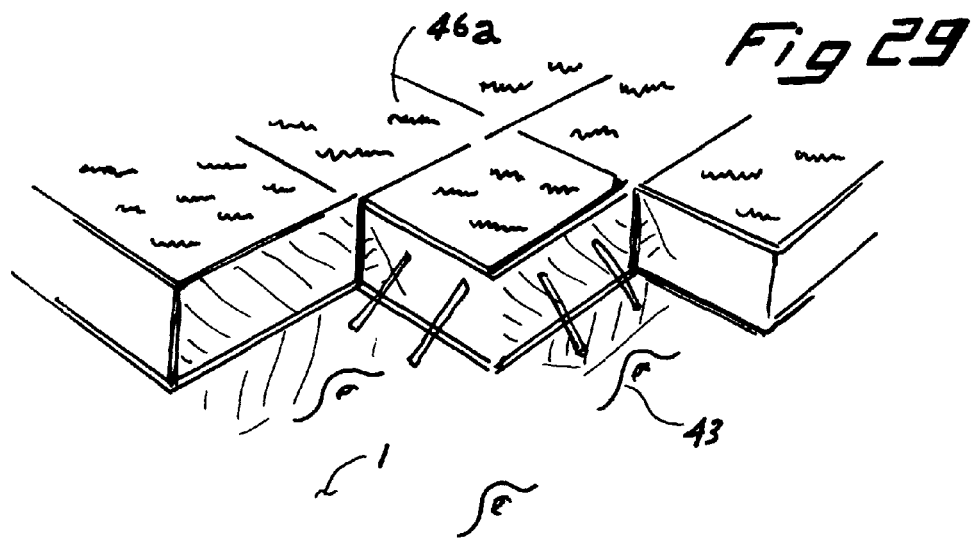

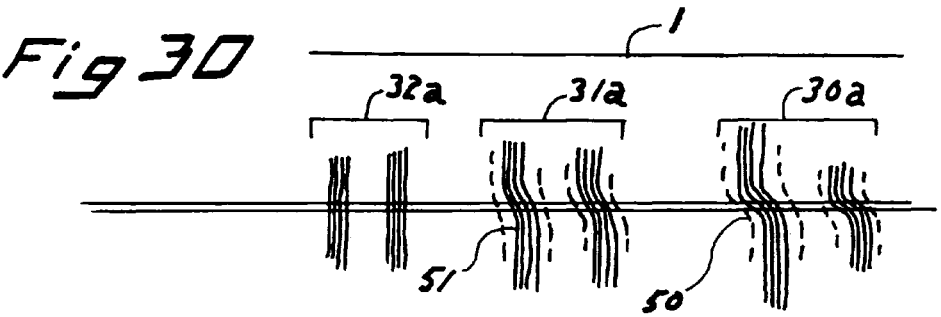
Fig 30
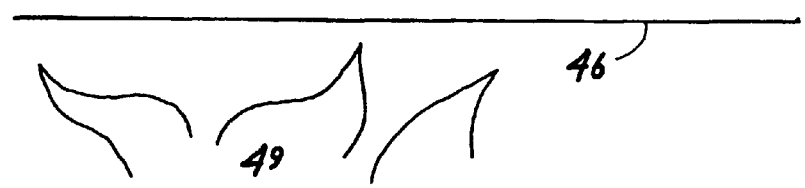
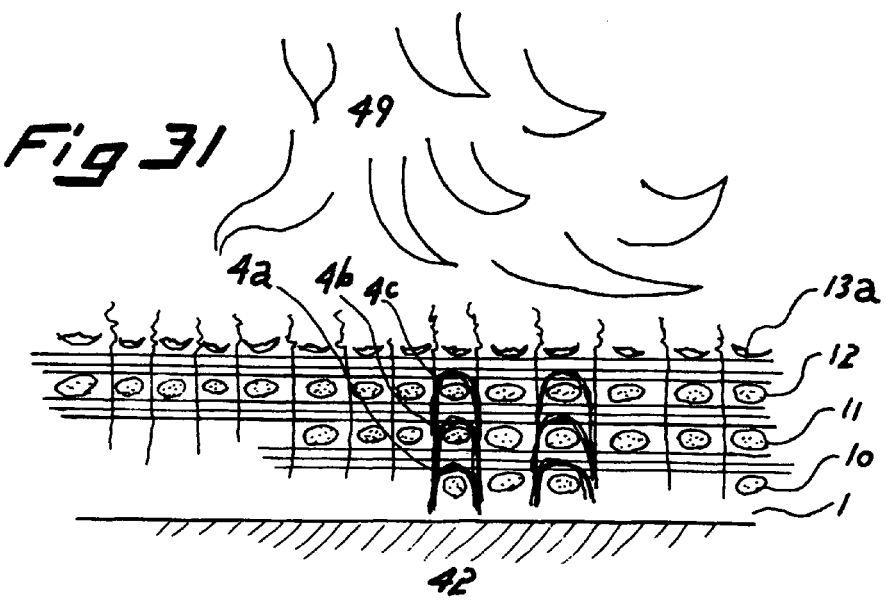
Fig 31

INTER/PRE-CURED LAYER/PRE-CURED EMBROIDERED COMPOSITE LAMINATE AND METHOD OF PRODUCING SAME

This application claims benefit of Provisional Application No. 60/879,105 filed Jan. 8, 2007

STATEMENT REGARDING FEDERALLY SPONSORED RESEARCH AND DEVELOPMENT

Not applicable

RESEARCH

| | | | |
|---|---|---|---|
| 1,216,265 | Bakeland | Feb. 20, 1917 | |
| 2,692,219 | Slayter et al | October 1954 | 154/44 |
| 2,762,739 | Weiss | Sep. 11, 1956 | 154/90 |
| 3,837,985 | Chase | Sep. 24, 1974 | 161/55 |
| 4,109,435 | Loyd | Aug. 29, 1978 | 523/091 |
| 4,196,251 | Windecker | Apr. 1, 1980 | 428/311 |
| 4,350,728 | Haung, et al | Sep. 21, 1982 | 428/105 |
| 4,469,541 | Goldsworthy | Sep. 4, 1984 | 156/180 |
| 4,808,461 | Boyce, et al | Feb. 8, 1989 | 428/119 |
| 4,938,824 | Youngkeit | Jul. 3, 1990 | 156/173 |
| 5,186,776 | Boyce, et al | Feb. 16, 1993 | 156/732 |
| 5,350,614 | Chase et al | Sep. 27, 1994 | 428/53 |
| 5,456,974 | Lundband et al | Oct. 10, 1995 | 428/229 |
| 5,466,506 | Freitas | Nov. 14, 1995 | 428/105 |
| 5,512,348 | Mazelsky | Apr. 30, 1996 | 428/102 |
| 5,589,015, | Fusco | Dec. 31, 1996 | 156/731 |
| 5,869,165 | Rorabaugh | Feb. 9, 1999 | 428/105 |
| 6,277,463 | Hamilton et al | Aug. 21, 2001 | 428/106 |
| 6,599,610 | Homma, et al, | Jul. 29, 2003 | 428/102 |
| 6,932,116 | Smith, et al | Aug. 23, 2005 | 138/98 |
| 7,192,634 | Carter, et al | Mar. 20, 2007 | 428/113 |
| serial 10/742,898 | Mitani, et al | publication date Dec. 23, 2003 | |
| 2005/0070183 | Dunn | publication date Mar. 31, 2005 | 442/59 |

FIELD

This invention relates to prevention of de-lamination as caused by peeling, sheering, lifting/bubbling, and the like in fiber-matrix/resin combination composite laminates. More particularly, de-lamination resistance utilizing embroidering, sewing, tying, stitching, penetrating, wrapping/bundling, etc of pre-cured tow, or pre-cured reinforcing fibers against pre-cured laminate.

BACKGROUND OF THE INVENTION INCLUDING A DESCRIPTION OF PRIOR ART

Starting from before the bronze age, laminating using a matrix or resin with a structural reinforcing fiber has contributed to strength in parts or surfaces. A good example of an old application includes the use of horse hair as a structural fiber with plaster serving as the matrix. After the development of resins like Bakelight, Bakeland (U.S. Pat. No. 1,216,265 February 1917) discovered after the turn of the last century, and glass fibers, first brought into use around WW II Slayter et al, (U.S. Pat. No. 2,692,219 October 1954), composite plastic laminates have shown up everywhere. Ranging from boats to car bodies to sports equipment to aerospace/satellites, there is a growing list of combinations that is too hard to keep track of and too numerous to mention. Representative examples include the more common combination of E-type fiberglass with polyester resin; a more elongation-homogeneous vinylester S-glass combination, a carbon fiber epoxy combination; a carbon fiber concrete combination and so on. Emerging types of laminates include systems where the resin can be a similar type of material as the fiber, i.e. "carbon/carbon" laminate. Here, after a fired set, the fibers can "aim" the strength in the preferred orientation while a carbon matrix would provide for unified thermal expansion characteristics (between the fiber and matrix) not to mention potentially very high operating temperatures.

Processes for laminating composites have branched out with even more divergence. "Spray and lay" might serve as the backbone of processes. A composition of E-glass "blanket" of matt may be wet out with polyester resin using a brush or spray gun, or both resin and glass could be distributed with a "chopper", than rolled out till the laminate would be the resin/glass and void of dry spots and air bubbles. It would be particularly important to get out these dry places and air bubbles since they would cause weak spots in the laminate, not to mention allow for contaminates (i.e. moisture) to occasionally diffuse into the laminate.

Another method to get out the air (albeit with thinner less-detailed type laminates) includes the process of vacuum bagging. All the air is sucked out of the laminate giving the bag the same pressure as the atmosphere and forcing an outer blanket of material to soak up the extra resin as well as press the laminate against the tooling surface to give it as high of fiber/volume ratio as possible, while still causing the layers to be glued together.

Involving temperature in the process can vastly increase the wet-time and reduce the labor of vac-bagging. Using pre-impregnated fibers or "pre-pregs", the fibers are already wet out, and already catalyzed. Either the increase of temperatures in an oven or allowance to attain room temperature from being previously chilled causes a temperature rise. The temperature rise allows prepregs to attain a set or cure while under the bag, while shipping, storage, preparation of material (i.e. loading the mold) occurs in a cold state before curing. More diverse types of resins such as thick viscous epoxy can be used when involving this process, however the process still is mostly limited to fairly thin layers of laminate per pass or per bagging.

Also considering heat, are the use of thermoresins where instead of chemically curing the matrix (i.e. thermoset resins: polyester, epoxy, vinylester etc.) the heat-meltable plastic (i.e. nylon, PET, PEEK) is melted. The bond is made between the hot plastic; when the laminate cools, it becomes hard and the part is done.

Other impregnation methods include types of Resin Transfer Molding RTM. (also Resin Injection Molding; RIM) In this process, high diffusion reinforcement is laid into a closed (i.e. male/female) mold and the resin diffuses throughout the surface of the part creating a "good-both-sides" laminate. Both Carter et al (U.S. Pat. No. 7,192,634 March, 2007) as well as Dunn (U.S. patent Ser. No. 0070183; publication date Mar. 31, 2005), have implications towards RTM type processes with channeling and re-melting or chemical wetting of fibers respectively. The challenge with RTM processes is that the resin must diffuse very easily and most likely it would need to be thin. The problem with this is when the resin chemically cures there is a likelihood that it shrinks and the ratio of fiber to volume would be less than with thick-pass layers, and there could be increased brittleness. Shrinkage even has consequences on surface quality: a large amount of shrinkage will cause "print-through" where the pattern of the shallowest layer shows up on the surface of the part. While thinner resins will wet out easier, there is most often a tradeoff between how much wetting can be done per layer vs. how much shrink can occur. A real low-viscosity resin will wet out more layers or thickness, but will tend to shrink more. A thicker resin will not do as well as a penetrating wet out but will shrink less. Less shrinkage not only has dimensional effects, but relates significantly to warping, surface caving, inner layer stresses (especially if previous layers are allowed to dry/set/cure. Because of this, many layers must be added separately to the laminate with the resin essentially gluing each layer to the previous one.

Functioning with both thermoset and thermoplastic resins and sometimes employing temperature differential is the process of pultrusion, and is to be found in Goldsworthy (U.S. Pat. No. 4,469,541 Sep. 4, 1984). Here is an example of where not only there is a pultrusion that can change its die-shape, but its die-cross-sectional surface area. There is also mention in Goldsworthy (1984) of pultruting inserted objects. The nature of pultrusion often implies much fiber that is unidirectional, long (with respect to the die shape) and therefore held together by glue strength. It should be noted that pultrusions can also be braided, or have braded skins. Beam loading forces on a pultrusion could enact sheer forces between compressive and tensile orientations within the laminate. And, as in a point load in the center of a beam supported at each end, there is a case where large amounts of sheering could take place at the supported ends and cause failure by splitting with unidirectional fibers and glue strength, or sheering between the top wall and bottom wall in a braided "tube" like structure. If there were lots of perpendicular fibers situated especially at the ends that could lock the unidirectional fiber or walls of a tube together, there would be much more strength and resistance against sheer, especially when more room for perpendicular laminating can be provided by lesser requirement for lengthwise orientation of fibers near the ends. This extra open space (the closer to the end, the more space) could be filled by substantially perpendicular fibers that would tie the ends together as exemplified in [FIGS. 15 and 16] regardless of how thick the pultrusion/beam would be and regardless if it contained an object or inclusion.

The problem with all these processes is that extra layers of laminate or passes have to be made. They have to be thin enough to get the air out, and because of this thinness, the layers have to be essentially glued together with the resin. Often in these multiple passes, the layers can easily delaminate Limit for a Single Pass Most of the time the fibers are treated with sizing that allows the resin to circulate and diffuse throughout the fiber blanket to help get it wet. If the fiber fails to locally get wet out or to a lesser effect, has air bubbles, the whole structure is weakened, not to mention coming up short of other properties like water tightness or aesthetic appeal. To be able to get out the air and homogenize the structure, there is a minimum amount of a layer that can be applied at once. If the layer is too thick, or if the inverse of the layer thickness vs. the viscosity of the resin is too far off, the resin will not wet out and circulate to the drier layers beneath. With this problem, the part could cure before the lamination can be properly rolled or brushed/blotted out. If running vac bags, the dry spot might not ever be compressed in the first place and the void will have strength not much greater than the pre-production fibers. Instead of a stiff strong lightweight part, the local dryness will have the same properties of fibers that are not wet out.

All of the former processes may imply representations of what one pass is. Examples are shown with the following list:
cloth (i.e. 4 oz/sq yd; 5 k tow 0 deg.; 90 deg.),
roving (6 oz./sq ft; 50 k tow 0 deg.; 90 deg.)
50 to 300 g/m^2, as found in (U.S. Pat. No. 6,599,610 Homma, et al, Jul. 29, 2003)
matt (0.75 or 1.5 or 3 oz/sq ft), E-Glass
10 mil surface or C-veil
1 to 50 g/m^2 as found in Mitani, et al, (Ser. No. 10/742,898 filing date Dec. 23, 2003)
Fabmat (roving sized in and stuck to matt), 5 oz/ft^2
5 k tow carbon fiber side-by-side 10 mil tape,
20 mil S-glass unidirectional tape
20 mil aramid unidirectional tape The two common characteristics of this list are that 1. they are set up to be wet out in one pass; 2. they represent the relative thin skins that are involved in laminating. If there is a use for thicker skins, than additional passes need to be made.

Along with being weaved, the stitching of yarns and tows, fibers is commonly known in the art. These processes are always done in concert with sizing to make sure that the material is easy to wet out. Normally, a thin layer of resin sprayed over the blanket will adequately soak the resin after a minute or two. A 10 mil tape of carbon fiber will be thin because the intended resin to use with it, epoxy is very viscous, thick and difficult to handle. Fabmat that may have 1.5 oz/ft^2 sized and tacked onto, say, a 5 oz/ft^2 roving, will be intended to handle reasonably thin polyester resin. When the inventor laminated a typical epoxy with a 3 oz/ft^2 matt, the resin barely coated the surface. If it were not soaked in an overabundance of epoxy and laminated for an unexpectedly long time would have cured that way.

Carbon 5 k tows in the example list may be sewn together with a very thin strand group of glass so that they can be laid in as a unidirectional tape. Differing directions of fiber may be sewn together to provide strength in multi directions (i.e. 0 deg. sewn to 45 deg to 90 deg.). An example is found in Homma, et al (U.S. Pat. No. 6,599,610 Jul. 29, 2003).

In all of these cases,
1. The stitching is used to hold the component layers together throughout the process of lay-up.
2. The stitching is done while the reinforcement fibers are dry and before any wetting out and adding of curing agent.
2. The stitching is thin enough/wettable enough that it is easily wet out in one pass, but does not contribute significantly towards strength in the Z-direction.

Note that one pass refers to being able to wet out a blanket of reinforcement from the "top" and be able to reasonably have it get wet on the "bottom". If there would be any fibers strong enough to have influences in the Z-direction, i.e. if the "Z" fibers would substantially add strength in the "Z" direction over the glue strength of the resin, they might not be able to be wet out in one pass. If a relatively thick tow were wet it could embroider two or more heavy wet layers against one another that would otherwise be too thick to wet out altogether. If layers were able to be tacked in advance with the tacking allowed to dry as in Youngkeit, (U.S. Pat. No. 4,938,824 Jul. 3, 1990) there could be a large risk of air or voids around the places where previous resin had dried and where it would have to be against newly-curing wet resin. Also in the process of filament winding/tape winding the process which is well represented by Youngkeit (1990) there is referencing to where the fibers slide, get smashed out or "peel or slough away" and for some irregular shapes waste material in "false domes". If the tapes were to be tied around loops or hooks at the ends that could suspend the tension to some degree (as in [FIGS. 26, 27,28,29]) before the tape changed direction again, a degree of tension could be still maintained in the wrapping and peeling away could be minimized In all the cases, the sheet or blanket of reinforcing fiber whether it is stitched-together components or not, is prepared to be wet or laid in a single pass; if the fabricator would lay down too many layers at once, or try to lay too much down without being able to wet it out, the part would need to be repaired or scrapped. While there are products that encourage sticking together of a dry layer to a fresh wet layer, this is often a region where the layers could come apart or de-laminate. Delamination can even occur between layers that were previously prepared together. An example could be where fabmat was used in a part. While fabmat is matt adhered (i.e. with sizing) or stitched to roving, there could be a separation between that matt and roving even though they were laminated on the same pass together. Delamination can occur due to physical stress in short term as well as chemical stress in the long term (as examplefied by "blistering"/bubbles that grow inside the laminate of boat hulls over a period of years).

Composites made up of resin/fiber combination or matrix fiber/fiber combination (like in ceramic) often can delaminate due to the tensile strength of the reinforcing fiber being greater than that of the glue-strength of resin. Causes of delaminating can include mechanical forces in the direction normal to the laminated surfaces, mechanical forces relating to sheering, chemical, thermal burn-offs, thermal shrinkages, variation of properties from layer to layer that include differing shrinkage rates of the layers, or changing properties causing sheering between materials of the layers. Further causes include differences or changes in properties which may include brittleness, ductility, elasticity, etc.

An example of a light weight sandwich comprising of inner and outer layer and pinned together is to be found in Rorabaugh, et al (U.S. Pat. No. 5,869,165, Feb. 9, 1999) similar is Fusco (U.S. Pat. No. 5,589,015, Dec. 31, 1996) Boyce, et al (U.S. Pat. No. 5,186,776 Feb. 16, 1993; U.S. Pat. No. 4,808, 461 Feb. 8, 1989), Freitas (U.S. Pat. No. 5,466,506 Nov. 14, 1995), Windecker (U.S. Pat. No. 4,196,251 Apr. 1, 1980) et al. This is very lightweight and cost effective, however, if it were to involve embroidery, the hold-together material would be resin impregnated fiber tow, and would offer the opportunity for using the same type of resin and fiber as the outer laminates, Even if the wetted tow were heterogeneous, it would be much lighter, and more cost effective to embroider than to use pinning or the like to hold outer layers of a sandwich or the like together.

Weiss (U.S. Pat. No. 2,762,739 September, 1956) employs glass fiber in holding together outer layers sandwiching a foam core between. However, there is no mention of pre-wetting out the fibers which would lead to rapid drop in performance as the fibers could easily get frayed given abrasion, vibration, etc. If a pre-cured embroidered type system were to be worn, even cut completely through in places, all the other tow groups would still pass through the sandwich, and individually lock the outer layers together, thus allowing the partially damaged panel perform adequately as opposed to the whole system becoming unraveled.

Loyd (U.S. Pat. No. 4,109,435 Aug. 29, 1978) resists peel forces by means of barbed quill to hold substrates together. This and other like methods to prevent de-lamination would deposit extra metal in the laminate producing a heavier part than embroidering, and not work as effectively.

Chase (U.S. Pat. No. 3,837,985 Sep. 24, 1974) uses pins inserted into and tape wrap laminate in an ablation heat shield for a re-entry vehicle. This reference represents use of heterogeneous method, however does not anticipate the concept of unibody but rather comes in with the devices that tie together the system as an afterthought. In this invention, embroidery causes a tied together laminate to be a substantial unibody with layers, allowing possibility for embroidery, and layers of laminate to all cure at substantially the same time.

While Haung, et al in U.S. Pat. No. 4,350,728 (Sep. 21, 1982) have references to the problem of sheer in being a main problem of de-lamination of composite laminates as well as having mentioned peel issues, the current availability of high performance fibers joined with the technique as mentioned in this invention would trump the need for metal wire reinforcements to arrest de-lamination and prevent it from starting. In other words, pliable fibers such as aramid, running perpendicular to a wing spar would hold upper and lower laminates in spite of the event of a shear failure even though they may be loosened up. They would be lighter than metal, and if embroidered, would be less expensive to install, so would be doubly cost effective.

A torque box example is to be found in Hamilton et al (U.S. Pat. No. 6,277,463 Aug. 21, 2001) similar to a "box beam" rigid-structuring. This reference deals with de-lamination like filament winding which depends on "hoop" strength to do slightly better than the glue strength alone. A method of wrapping the perimeter of a laminate will not solve the problems that embroidering could, of a de-lamination of, say, a de-laminating T strut. Embroidering or needle pointing the core of a T strut would make it much much stronger over a folded perimeter wrap for that same part. Embroidering, as mentioned above in a wing spar could be employed as a safety measure that would prevent catastrophic failure in peeling and sheer, however if that same component were edge-wrapped, it would fail catastrophically once the glue strength started giving way. Other examples of where a wrap would fail would be in a case of thermal or chemical (i.e. corrosive) activities, especially when expansions or weakening of resin (as well as increasing the stresses) would occur.

Expansion issues specifically could include where a heated side of a laminate would begin to expand while a base layer would remain constant. Chemical activities could include where resin bubbles up form the inside and creates voids in the center of the layers, a phenomenon commonly known in the art.

All laminates like filament wound, wrapped, laid, with the exception of weaves within a single layer, and braids and the like would be at the mercy of this phenomenon.

Filament winding can provide lots of skin strength, and hoop strength, however, it is somewhat limited to geometric continuity. It would be impossible to filament-wind or wrap a bowl-shaped core. Tying can be done custom as may be wrapping or winding, but needle working-type processes can bring the laminate into concaves. It would be very difficult to wind complex shapes and the process does not lend itself to strengthening particular localities. Also, winding alone would not lend itself to having connecting spars that provide wall to wall strength, upper to lower surface strength, and the like, i.e. keeping the opposite walls from expanding apart from each other at poles. Embroidering type operations can be a good supplement to winding, in other words, wind, then tighten the concave parts down by embroidery, or tie off and bundle up a trunk at an end of a winding or wrap.

As mentioned earlier braiding in a pultruded part can be a way of strengthening the part and could be a very good way of preventing de-lamination of skin in a tube, or even in a tapered or formed object. This would be especially true in cases of where the skin of a tube can be braided. Embroidering again would be the only way to solve certain challenges that call for specific types of strengthening in specific ways. For example in a braided cylinder, there may need to be a lug that supports some kind of secondary part. Simply drilling a hole here would fray the braid, and surely weaken the pultruded braided cylinder. If the lug were to include an embroidery, and perhaps all layers could be ran wet, all the fibers of the braid would be still intact while the embroidery would provide the extra local strength it could be the way to add a "hard point".

Or if some of the tows of the braid were strained or broken, they could be made up for, and integrated back into the tube with embroidery. In this fashion, embroidery can be a good supplement to pultrusions. Another example of deficiencies in pultruding, wrapping or filament winding would be if there would need to be spherical tank laminated into a sheet or plate shaped composite structure: neither pultruding nor filament winding would very effectively do the job while embroidery would successfully take care of it.

Examples of third-dimension embroidering, sewing, etc are to be found with body armor examples. There is no mention made here of making a resin-fiber combination laminate in these, especially those formed in the pre-cured state. Such examples include Lundblad, et al (U.S. Pat. No. 5,456,974 Oct. 10, 1995), or with sacrificial-sheering embroidering elements as in Mazelsky (U.S. Pat. No. 5,512,348 Apr. 30, 1996). Embroidering done to a pre-cured system with pre-cured tow/strand would allow new possibilities for improving armor protection over the existing art, with the added protection from stabbing (i.e. armor-piercing stabs with a knife or spear) that rigid laminated armor would have over soft armor. When heterogeneous parts are mentioned in armor, it usually means pockets in a cloth garment or vest with hard parts or shields dropped in. In the armor art, there is little mentioned in the line of hard and soft together in an all-in-one unibody.

The possibility of laminating with heterogeneous materials at the same time are fairly common in the art, and an example of a heterogeneous composite laminate is to be found in Chase, et al (U.S. Pat. No. 5,350,614 Sep. 27, 1994). Although this reference also brings up stitching, it does not mention using tows in the pre-cured state, but instead favors RTM, resin transfer molding, which means dry prepping for the fibers as opposed to embroidering them in while wet.

Carter et al (U.S. Pat. No. 7,192,634 March, 2007) discloses a support structure of a curable composition that includes soluble or part soluble fibers that are stitched in with the reinforcement. While these soluble or part-soluble fibers can be considered as pre cured,
1. They represent the matrix, as opposed to the reinforcement in the final curable composition;
2. They anticipate that the layer is to be wetted out, laminated, bagged, RTM (etc.), in a single pass;
3. There would be no reinforcement fibers stitched in the final curable composition; as soon as the fibers are dissolved, they become the matrix and take on the same properties as the matrix;
4. The ultimately cured fibers, since being representative of the matrix and not reinforcing fiber will not improve strength in the "normal" or "Z" direction of an otherwise "X-Y"-local composition over the tensile strength or peel strength of the resin or matrix alone;
5. And therefore soluble matrix stitching would not be able to improve upon the delaminating and or peel strength of the cured composition as the stitching of reinforcement fibers would.

DESCRIPTION OF THE INVENTION

This invention is basically a method of interweaving, stitching, sewing, embroidering, knot-tying layers of composite laminate together while the laminate, analogous to "canvas" in needlepoint, is pre-cured, and using fiber impregnated with pre-cured matrix as the "thread".

Pre-cured applies to any type of resin/matrix in a composite laminate and includes but is not limited to:
1. Wet/uncured thermoset plastic resin.
2. Heat cured thermoplastic resin before heating.
3. Prepreg (pre-impregnated) thermoset plastic resin that is cold with intention of curing at room temperature or with additional heat (i.e. autoclave)
4. Pre heat-welded thermoplastic resin in liquid, pellets, dust, or the like, which includes indirect sources of heating, like some welding, friction, and the like.
5. Pre-fired ceramic processed material.
6. Pre-cured, pre-dried masonry material.
. . . And so on.

Once the resin is hardened, the sewing, embroidery, knots, wrapping, etc of an impregnated tow or fiber bundle would engage in a mechanical lock, thus binding in the layer, object, sandwich etc. into a solid that has better connecting strength that it would under the glue strength of the resin alone. The fiber itself would hold the component together mechanically hooking or looping around the outer layers of the composite.

When embroidering is done, the glue-strength between the layers is additionally enhanced by means of the tensile strength of the composite fibers that are used in the stitching. The strength of stitching between laminates will vary between that slightly above the glue-strength of the resin (as would be obtained by occasional stitching between the layers), to the aggregate tensile strength of the combined fibers totally packed in the direction normal to the laminate (as would be seen with maximally stitching a laminate in the Z direction).

Once the resin is hardened, the looping impregnated tow or fiber bundle would engage in a mechanical lock, thus binding in the layer, object, sandwich etc. into a solid that has better connecting strength that it would under the glue strength of the resin alone. In other words, the fiber itself would hold the component together mechanically hooking or looping around the outer layers of the composite.

OBJECT OF THE INVENTION

It is an object of this invention to provide a laminate that is held together layer by layer by means of fiber as well as by resin.

It is an object of this invention to prevent de-lamination:
(1) By increasing tensile between-the-laminate strength from that of the tensile strength of pure resin itself to approach that of the tensile strength of fiber i.e. the fiber will be strong in that dimension normal to the laminate or tool, or in the Z direction This is in addition to the fibers already having potential for strength in the X-Y direction, and refers to both individual fibers/tow (peel strength) as well as collective fibers/tow (tensile strength)
(2) by increasing the peel strength by strategic placement of fibers having different properties in different locations
(3) by stronger encapsulation or inclusion of manifolds, foreign heterogeneous objects, cavities, etc. within the walls of a laminate. I.e. to laminate out the possibility of these embedded objects, cavities, etc. from being weak, or causing a delaminating weakness within the wall or trunk of a laminate, and to provide this continued strength due to fiber bond in spite of sheer forces that may occur between non-like materials.
(4) by decreasing odds of catastrophic failure by having inter-embroidered fibers still holding in spite of resin beginning to fail. In other words, a laminate that fails in degrees as opposed to failing suddenly, allowing continued function until the part can be replaced
(5) by providing extra peel, rip/tear, sheer strength and the like from using materials of multiple properties wherein perimeter or boundary rip/tear and peel, sheer strength is characterized by slow deterioration in lieu of catastrophic failure It is another object to provide fiber based tensile force in the peel/Z direction far beyond the ability for a pre-wetted weaving intended for a single pass: in other words, to provide uniting tensile force between layers that have to be wet-out, impregnated in multiple different passes.

It is further an object of this invention to provide a means of bonding layers and items with non-like properties into a laminate with that bond between materials of non-like properties exceeding the glue-strength of the matrix involved.

It is further an object to provide opportunity in the pre-cured state (i.e. pre-cure, "wet-out" for thermoset resin, pre-melt for thermoresin, pre fire for ceramic processed, etc.), for fibers of laminate layers to be sewn, embroidered, woven, tied, etc. together, such that after curing, not only will there be a chemical bond in the cohesive glue strength, but there will be additional mechanical bond in the form of rigid resin-stiffened fiber groups mechanically locking themselves to differing layers of multiple layered laminates.

It is further an object to allow heterogeneous items including three dimensional forms, shapes, manifolds, screens, already-cured laminates of differing or the same material, flat shapes, plates or sheets with embroidering perforation, etc. to be sewn, embroidered, woven, tied, wrapped, wound etc. into a laminate, thus allowing the heterogeneous items to be embedded inclusions within the laminate, being held in place by fibers in organized fashion in all three dimensions as well as depending on the adhesive glue strength of the resin alone.

It is further an object to provide for external or internal barriers made of heterogeneous material secured to structural substrate by means of embroidering, sewing, tying, wrapping, etc It is further an object to provide for structural symbiosis by allowing structurally weak materials that possess high performance characteristics otherwise, to be embroidered, sewn, etc to structural base material thereby resulting in a product of even higher aggregate result performance.

It is further an object to provide gradual failure in lieu of sudden catastrophic failure in surfaces of cantilevers, box-beams, torque boxes, thermal barriers, chemical barriers, mechanical barriers, and the like.

It is further an object for installing ablative burn-offs, chemical sacrificial barriers and the like, a means of mechanical connection with a main body in symbiotic fashion wherein previously, adhesive and cohesive processes, due to weakened glue-strengths, thermal expansion, chemical weakening of resin, thermal or chemical reduction of physical capabilities may have prevented that connection.

It is further an object to provide capability to add strength to weak areas of extremely complex parts It is another object of this invention to provide for a laminate that is heavier per wet-out-pass than what would normally be expected by the soaking ability of the fibers and sizing, while providing for discernable amounts of additional strength in the "Z" direction—that would not have been able to have been wet out in that pass otherwise It is another object to provide for the situation/orientation of fibers in a normal or "Z" direction (for an "X-Y" surface) on a larger scale than can be done with a single pass wherein since the "Z" situated fibers are applied wet, that there will be no wet out problems, bubbles, dry spots inside the "Z"-situated component or its relative X-Y environment.

It is a further object of the invention to provide for resistance of "blistering" or de-lamination of layers of a laminate later in the life of the product.

DESCRIPTION OF THE DRAWINGS

The teaching of the invention will be more clearly evident upon examination of a preferred, and several alternative embodiments.

FIG. 1 shows concept of peeling laminates.

FIG. 2 shows a theoretical path of an individual stitch.

FIG. 3 shows that stitch as a composite tow or filament group drawn through with a theoretical needle.

FIG. 6 shows multiple gang sewing suggesting mass production.

FIG. 7 shows a multiple wet-out laminates stitched together.

FIG. 8 shows individual stitch detail after hardening.

FIG. 9 shows multiple layers, each stitched together from the inside to the outside.

FIG. 28 shows the cured assembly as subjected to heat.

FIG. 29 shows an opposite method of heterogeneous blocks where blocks are assembled in pre-cure.

FIG. 30 shows sheering heterogeneous block that is attached by fibers under expansion due to heat.

FIG. 31 shows ablative layer of assembly such as in FIG. 10 with outer layers being burned off.

DESCRIPTION OF A PREFERRED EMBODIMENT

Figure 4:
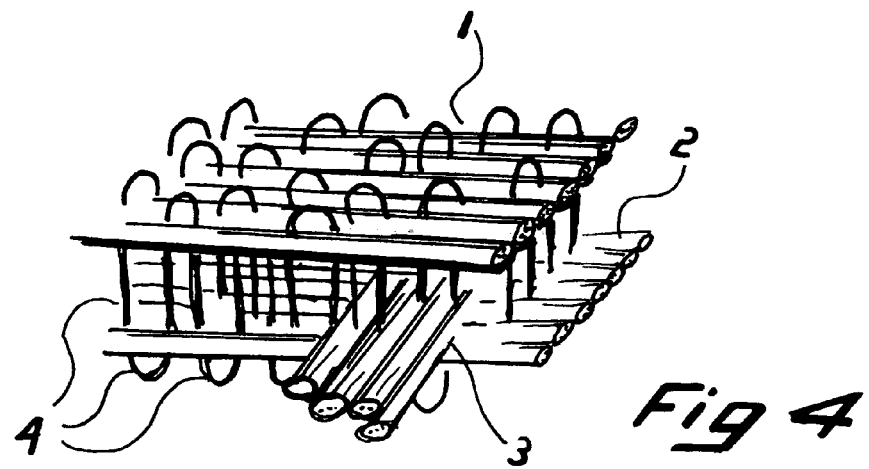
FIG. 4 shows a wet-out being sandwiched between two more wet-outs and embroidered together.

De-lamination is usually the consequence of peel strength failure as shown by layer (1) peeling away from layer (2) in [FIG. 1].

Peel strength failure as well as tensile strength failure from pure resin can be avoided by stitching layer (1) and layer (2) together as shown in thread path (4) in [FIG. 2]. It should be assumed that complete layers (1) and (2) are the thickest that they can be while impregnating in one pass, i.e. if the stitching were done in pre-impregnation, to the complete layers, they would not get fully impregnated. Thread path represents a fiber bundle or tow (4) in [FIG. 3] as pulled through by needle or similar device (5) Said layers (1), (2) and thread (4) are composite laminates in the pre-cure stage as wet-out with resin.

Figure 5:
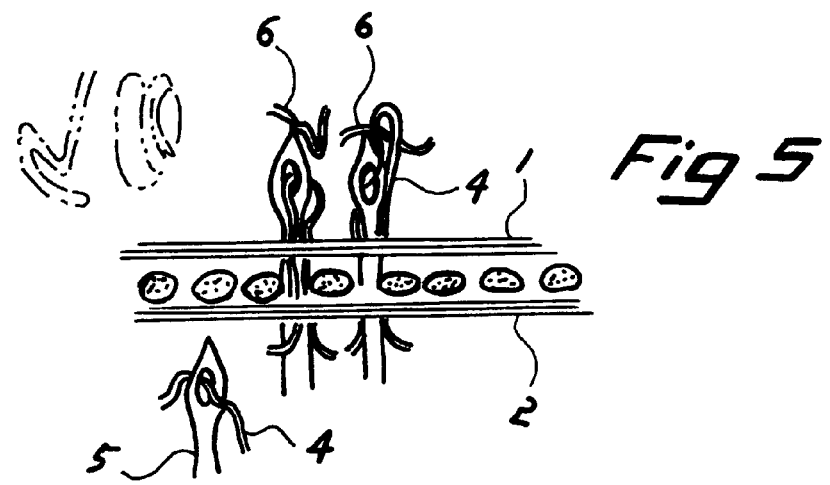
FIG. 5 shows a machine sewing process for sewing fibers together.

Multiple thread paths (4) as shown in [FIG. 4], can hold together multiple wet-out layers (1), (2), (3) together while each layer is wet-out individually or together. An automated sewing process as shown in [FIG. 5], sews layers (1), (2) and (3) together by pushing needle (5) with eye at point threaded by fiber tow or bundle (4) through layers (1), (2), (3) and then withdrawing causing a loop that is passed through with another fiber bundle (6) having been threaded with a bobbin and shuttle, (not shown), or hook (not shown), both commonly known in the art of sewing.

[FIG. 6] represents a mass production version of this sewing process by means of gang-needles (5) sewing layers (1), (2) together in a high production fashion before laminate cures. [FIG. 7] could represent a lock stitch including two different bundles/tow (6) and (4) embroidered to the outside of the laminate layers (1) and (2), holding all inner layers (3) together.

A sewn or embroidered laminate does not have to be tight like in garment and clothes manufacturing. Once the resin soaked fiber bundles (4,6) cure, they will still exhibit strength even if there is curve in the thread path (4a) in [FIG. 8].

Once the laminate cures, tow/fiber bundle (4) is frozen in place such that on one surface the upper curve in the tow/fiber bundle (4) hooks and holds multiple criss-crossed or matt layers (8) together with tow/fiber bundle at bottom (6) in [FIG. 8]. At bottom, tow fiber/bundle (4) goes through tow fiber bundle at bottom (6) like a loop and peg in a form such as maybe found in a chain stitch (commonly known in the art of sewing). When everything becomes rigid, bundle (4) will mechanically link with bottom bundle (6), thus binding together multiple criss-crossed, or matt layers (8). Thus, the tensile strength of fibers in bundle (4), plus the sheer strength of the bottom bundle (6) will resist de-lamination in addition to the glue-strength of the resin.

In [FIG. 9], inner layers (8) are stitched together, as an inner sandwich by fibers along inner thread path (4b), while the rest of the layers of the laminate (9) are embroidered to the inner sandwich of layers by means of fibers in the outer thread path (4c). Additionally layers (1, 2) are embroidered as an outer embroidered group. In [FIG. 10], base layer (1) is bound to next layer (10) and the set of both of those are bound to (11) and so on, so that each progressive layer of independently wet out laminates, prepregs etc. (12 through 14) is embroidered to the succession before it.

Figure 11:
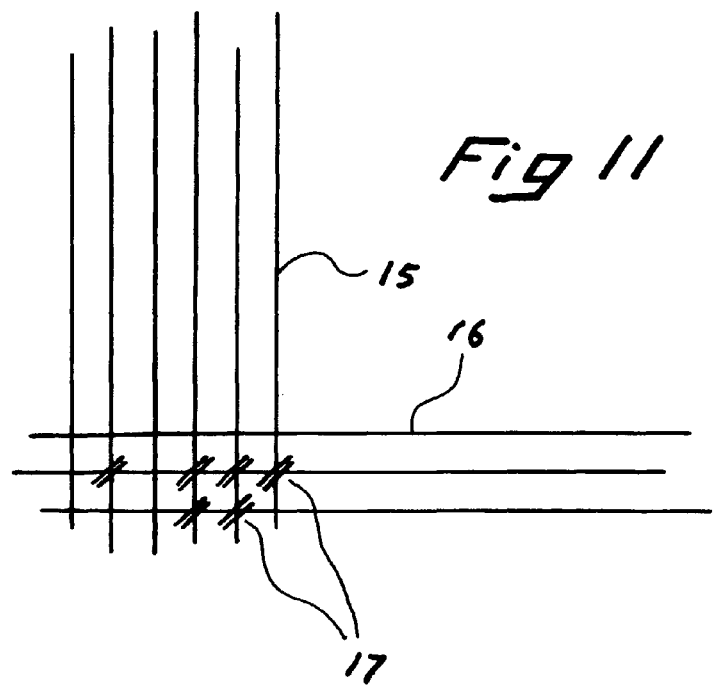
FIG. 11 shows two layers of tape laid up 90 degrees to one another, stitched together at 45 degrees.

[FIG. 11] shows unidirectional tapes (15, 16) oriented substantially 90 degrees to one another and loosely sewn to one another with a fiber bundle or tow at 45 degrees (17). Tow (17) are sewn at gradual angles to tapes (15,16) so that while it interlocks, it provides strength in the substantially in the X-Y direction, as well as allowing for both tapes being held together in the Z direction

DESCRIPTION OF AN ALTERNATIVE EMBODIMENT#1

Figure 12:
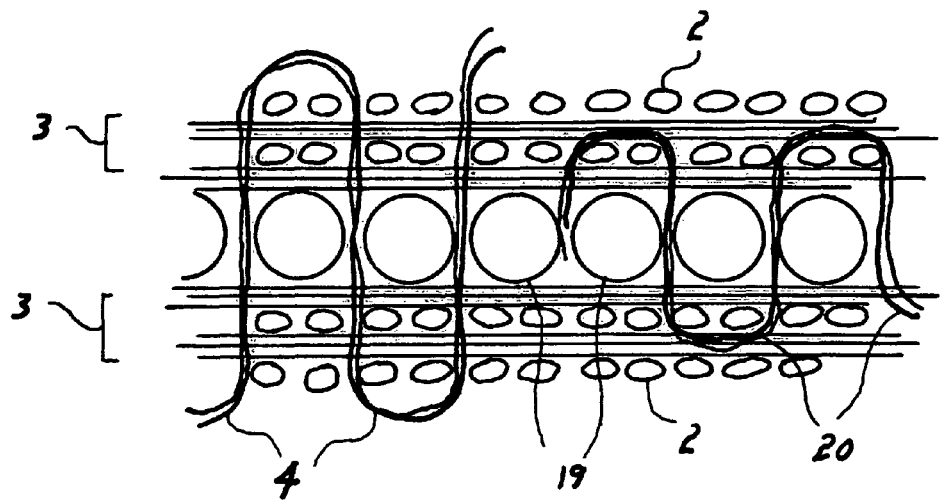
FIG. 12 shows the laminate of heterogeneous material.
Figure 13:
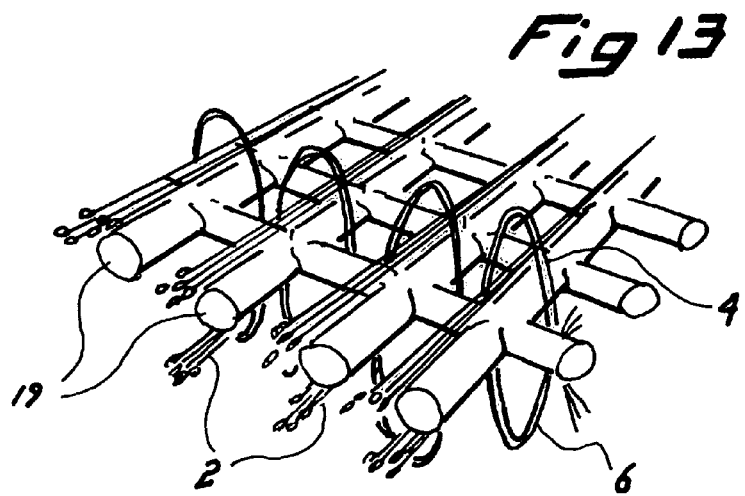
FIG. 13 is a perspective view showing that heterogeneous material as grid shaped manifold.

[FIG. 12] shows a laminate with outer layers progressively stitched to inner layer similar to that of [FIG. 9], sewn with inner tow layer (20) and sewn to outer tow layer (4) and with center layer (19) being heterogeneous material with different chemical, physical properties than that of the rest of the laminate (9). Said inner structure (19), in [FIG. 13], could just as easily be a solid grid, grid-shaped manifold such as metallic "ASTROSTRIKE"® lightning strike protection material for composite airplane skins, or a battery that is laminated into the wall of a composite part, or the like.

Figure 14:
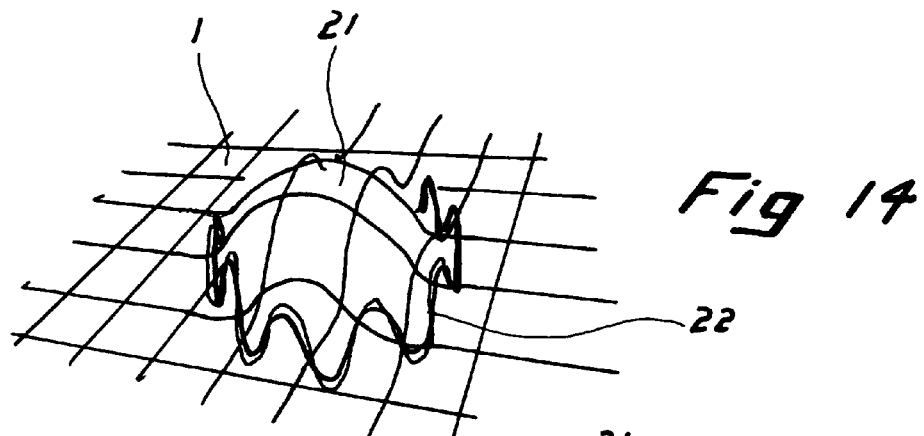
FIG. 14 shows a heterogeneous sphere or space within a laminate.

Non homogenous materials, hollow spaces, active hollow spaces (such as those that do mechanical work like in a pressure tank, those with thermal activities, so on) are also laminated in [FIG. 14 thru 17],

[FIG. 14] shows upper layer (1) and lower layer (2) both being complete-wet-out and encapsulating sphere shaped object (21) with perimeter (equator) where layers (1) and (2) part, stitched together with fibers along thread path (22) thus re-strengthening weak spot around part line (not shown) that could cause de-lamination.

Figure 15:
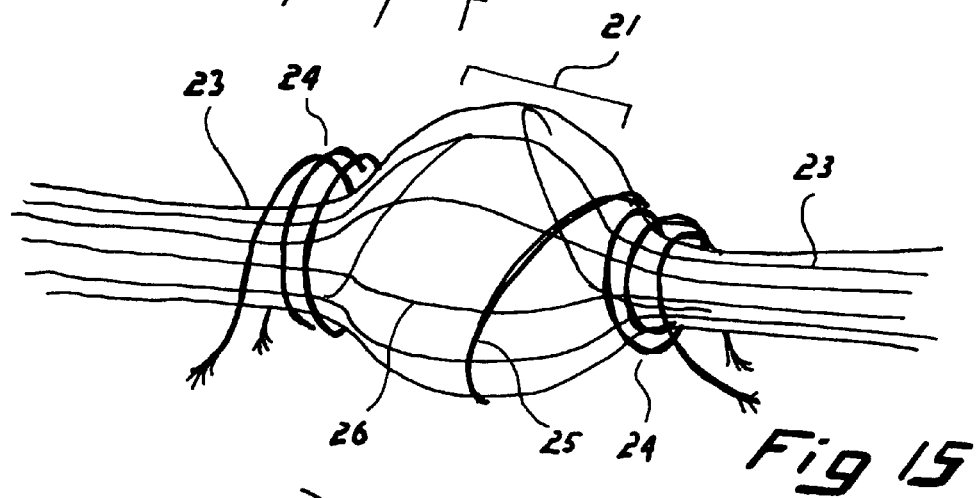
FIG. 15 shows a sphere or space laminated into a trunk.
Figure 16:
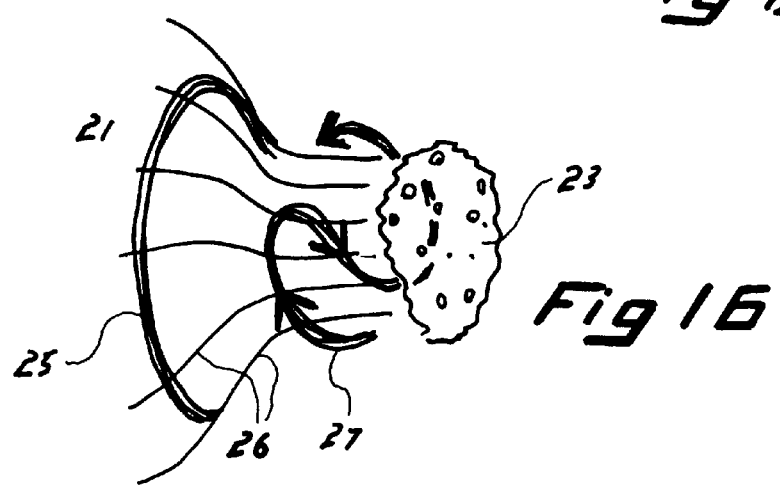
FIG. 16 shows detail of the sphere or space laminated into a truck.

FIG. 15 shows laminated trunk (23) which encompasses sphere shaped object, hollow, etc., (21) which is laminated in axially, or longitudinally (26) and laminated in a spiral manor (25) with ends tied off with laminated fiber represented by thread path (24). The detail of sphere (21) in [FIG. 16] shows spiral laminate (25), axial/longitudinal laminate (26) with joint of sphere to trunk sewn together from opposing wall to opposing wall with fiber along thread path (27).

Figure 17:
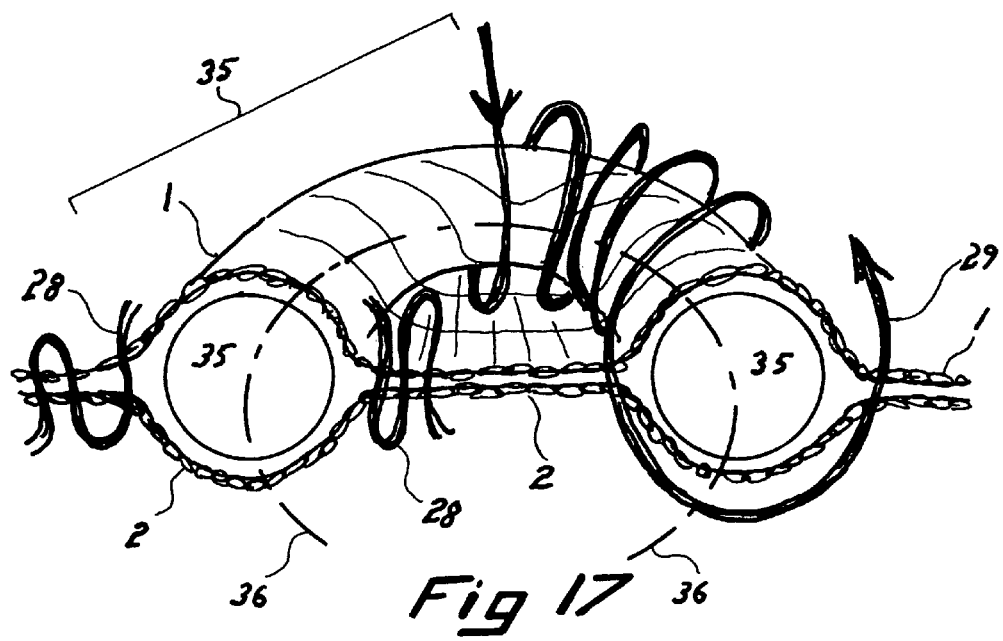
FIG. 17 shows a heterogeneous toroid or space within a laminate.

[FIG. 17] includes a toroid (35) object, hollow, etc., incased in a laminate with upper layer (1) and lower layer (2) and sewn in along the equatorial joint with fibers along thread path (28) thus strengthening weak spot in equatorial parting line (not shown) to avoid de-lamination. Fibers along wrapping thread path (29) represent encapsulating toroid about its circular minor axis (36) and sewing toroid into outer laminates (1), (2) as well. Structural failure can be regulated to a gradual fatigue as opposed to a catastrophic event by means of using fibers with different properties to do the stitching. [FIG. 18] shows upper and lower laminate (1) and (2) stitched together along an outside perimeter with fiber along thread path (30) that is tough and adaptive during strain (such as aramid fiber). Secondary perimeter as shown by fibers along thread path (31) just inboard of the outer perimeter (30) could use material such as S-glass with higher tensile strength although requiring less ductility and less toughness sewn along thread path (31). Inner fibers such as carbon fiber, sewn on thread path (32) can be maximized for tensile strength wherein fibers can be allowed to be more brittle.

Figure 18:
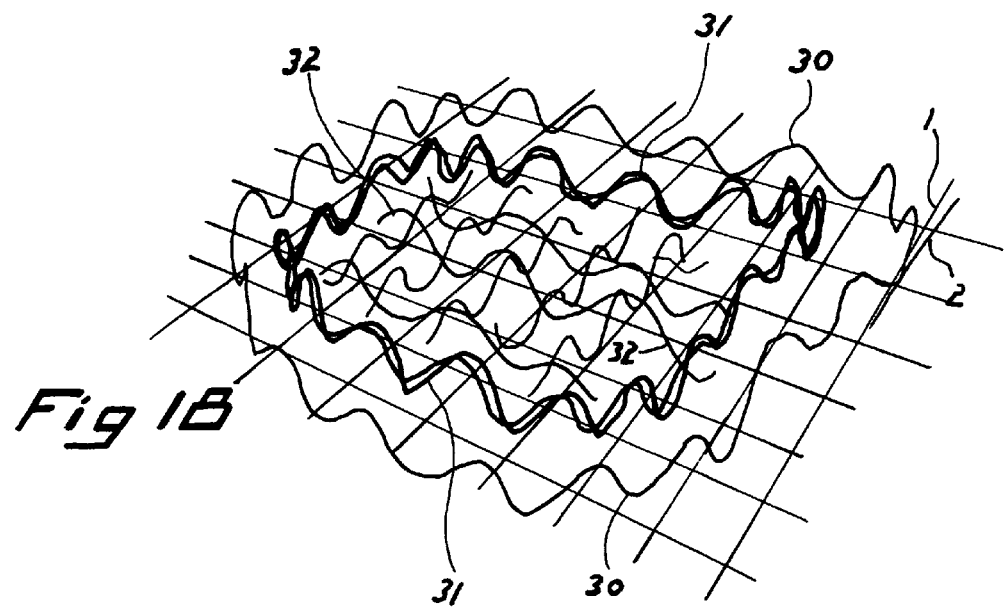
FIG. 18 shows the use of materials of varying properties used as stitching materials.
Figure 19:
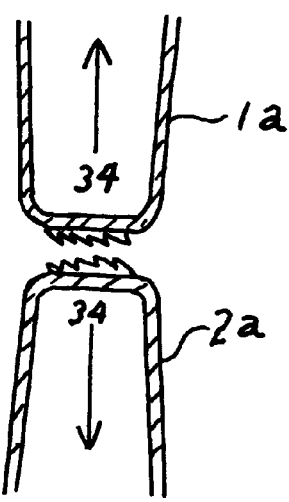
FIG. 19 shows two protruded laminates with a de-lamination of pure resin.
Figure 20:
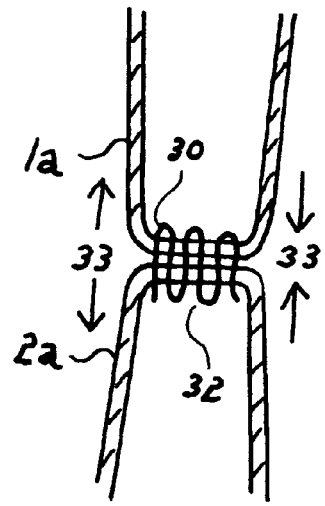
FIG. 20 shows protruding laminates bonded together by means of stitching, sewing, embroidery.
Figure 21:
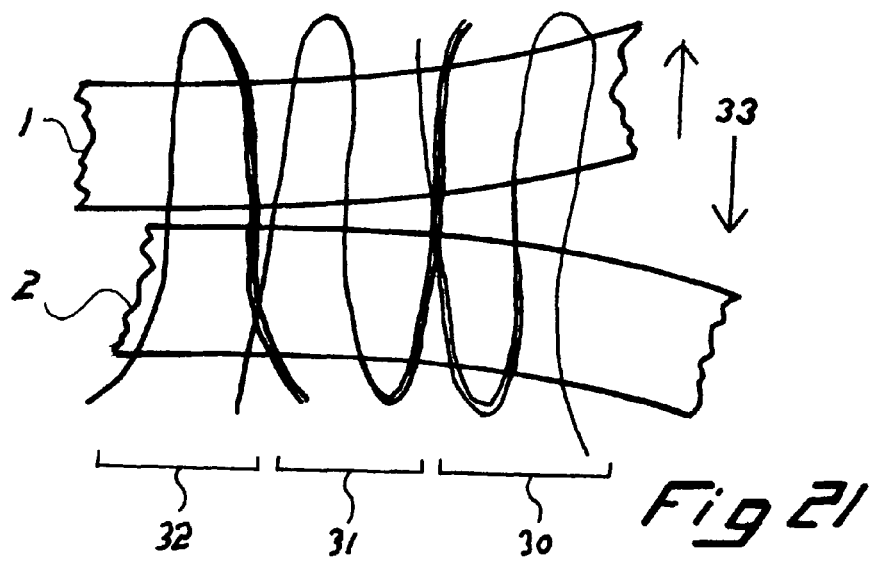
FIG. 21 represents a cross section detail of peeling action protruded laminate.

If a small area of contact between two layers which were part of extended laminates (1a, 2a) as shown in [FIG. 19], were to be introduced to tensile force (34) the tensile/glue strength of 12000 lb/in^2, for example, would give way first. [FIG. 20] shows the extended laminate of [FIG. 19] stitched together as suggested in [FIG. 18]. If tensile force (34) is introduced there will be peel strength resistance about the perimeter as represented in thread path (30); if peeling moment (33) is introduced, peeling stress will be concentrated even more at an opening point about the perimeter, especially putting stress on outer tows (30) in [FIGS. 18,20, 21]. The laminate would peel the most at the outer region (30) in [FIG. 21]

If these fibers were aramid (i.e."Kevlar"), the tensile strength would be increased, perhaps, in the range of 350,000 lbs/in^2. If the resin, failing at 12,000 lbs/in^2 failed first, the aramid might still hold. Fibers representing embroidery along secondary perimeter (31) in [FIG. 21] would be able to be somewhat more brittle, since the outer peel resistant fibers would hold on still, even though the resin began to fail. They could be S-glass which has tensile in the range of 600,000 lbs/in^2. This secondary zone might also continue to hold although the resin here would begin to fail. The inner zone (32) would be the area least affected by immediate peeling as long as the outer zones continued to hold on with their fibers despite the fact that the resin there had began to fail. This area could have the most brittle fibers yet, for yet another increase in tensile strength. This area could be embroidered with carbon fiber with a tensile strength of, perhaps, 1,000,000 lbs/in^2. Thus, the increase between a system of embroidered laminates could approach 100 times. If weaker resin is used, i.e. with tensile of 2000 lb./in^2, the embroidered bond could be 500 times stronger, and so on.

ALTERNATIVE EMBODIMENT #2

Figure 22:
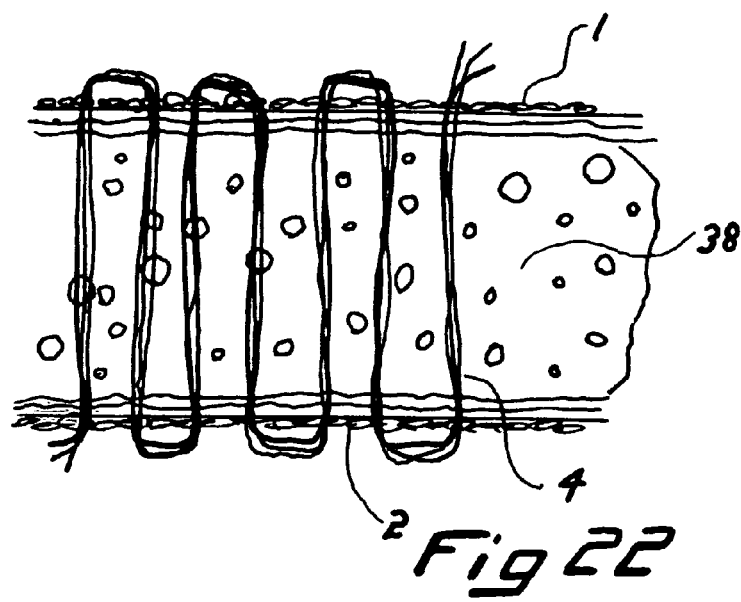
FIG. 22 shows an embroidering of two laminates with foam-sandwich type material in between where the stitching goes all the way through the sandwiching material.

[FIG. 22] represents the or sandwiching of foreign material such as foam or like core material (i.e. hollow "Hexcell"®, pumice-like "Klegecell"®, etc.) (38) where outside layers (1) and (2) are sewn together and through the foam (38) in order to encapsulate the foam within the laminate. Embroidered fibers (4) hold outer layers (1,2) towards each other in tension

PREFERRED OPERATION

Figure 23:
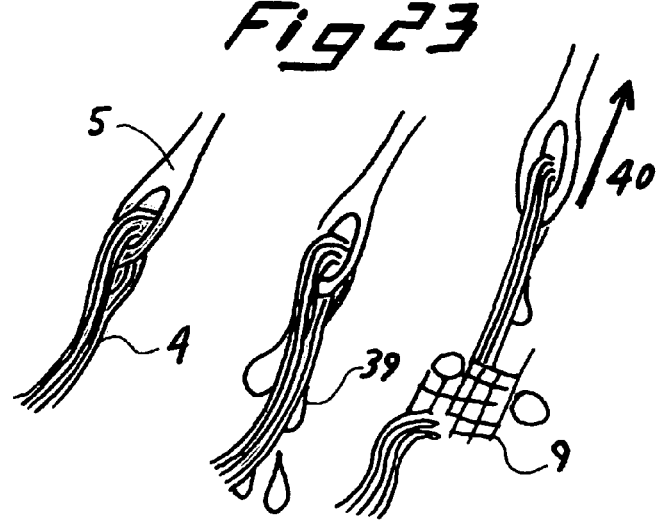
FIG. 23 shows the steps of the process.

While practical or symbolic needle (5) in [FIGS. 1,2] pulls fiber bundle/tow (4) through outer layers (1,2) in [FIGS. 1,2], fibers in tow are wetted out or pre-cured (39) in [FIG. 23]. As fiber bundle tow is pulled (embroidered, sewn, tied, needle pointed, and so on), (40), the laminate that is being stitched together (9) is also wet or pre-cured. Said tow (4) is pulled tight enough to make the stitch fast, yet not so tight that it would prevent proper wet-out or impregnation. Tow (4) and laminate (9) are allowed to settle, to be rolled out, to be vacuum-bagged, interference-wave welded, etc., after which, the stitched laminate is allowed to:
(A) cure in the case of thermoset plastics,
(B) dry in case of masonry type materials,
(C) be fired in the case of ceramics,
(D) cool off in case of impregnated thermoplastic dust
(E) be allowed to warm in case of thermoset prepregs/be allowed to heat cure for same
(F) and so on

ALTERNATIVE EMBODIMENT #3

Figure 10:
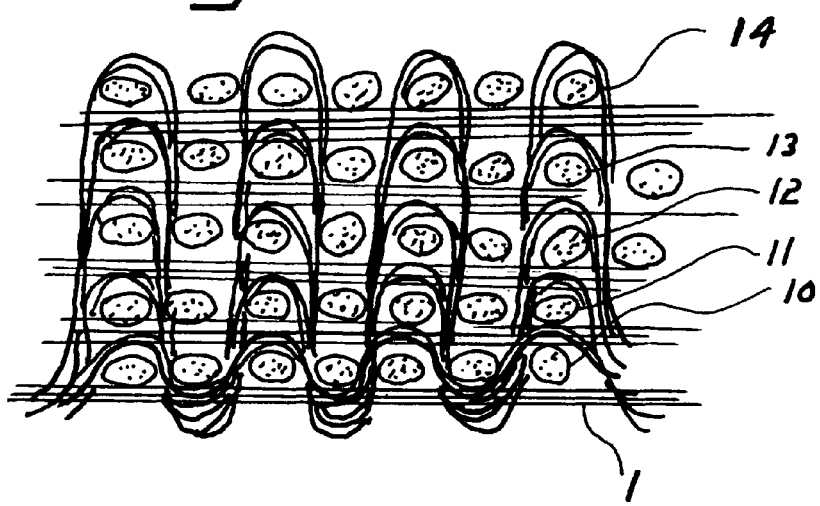
FIG. 10 shows multiple layers, each layer stitched from one side to the other side.
Figure 24:
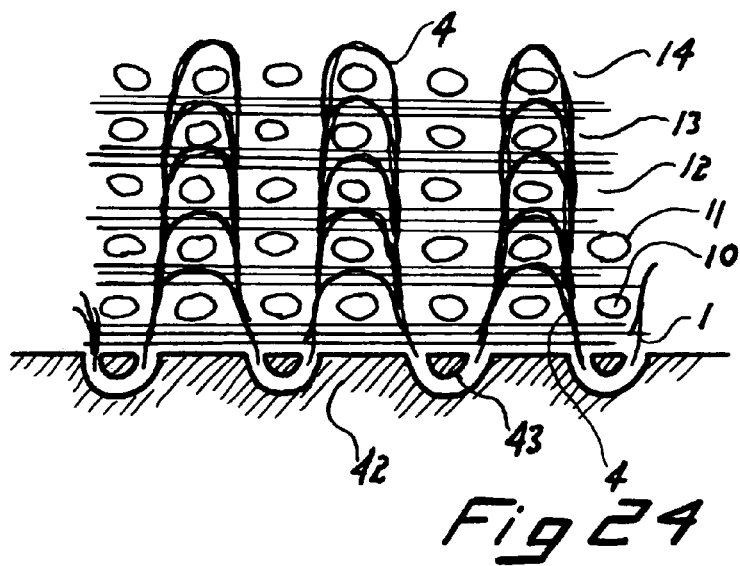
FIG. 24 shows the laminate of FIG. 10 except that the laminate is being stitched to a non-homogeneous substrate that includes pre-hardened and/or cast, or fabricated mechanical loops.

[FIG. 24] represents a progressively stitched laminate as similar to [FIG. 10] except with base layer (1), progressive layers (10, 11 through 14) being stitched into heterogeneous i.e. metallic substrate (43) through mechanical loops, knobs, dovetail, edge, bowl with a cornice-rim, etc. (43) or through heterogeneous laminated substrate mechanical loop, knob, dovetail, edge, bowl with cornice rim, etc. (44) including looping, wrapping, etc. fibers (45) wherein heterogeneous materials with diverse mechanical, thermo-mechanical, chemical, etc. properties may still remain joined despite being subject to extreme conditions, and extreme chemical, physical, dimensional changes in said heterogeneous materials

ALTERNATIVE EMBODIMENT #4

Figure 26:
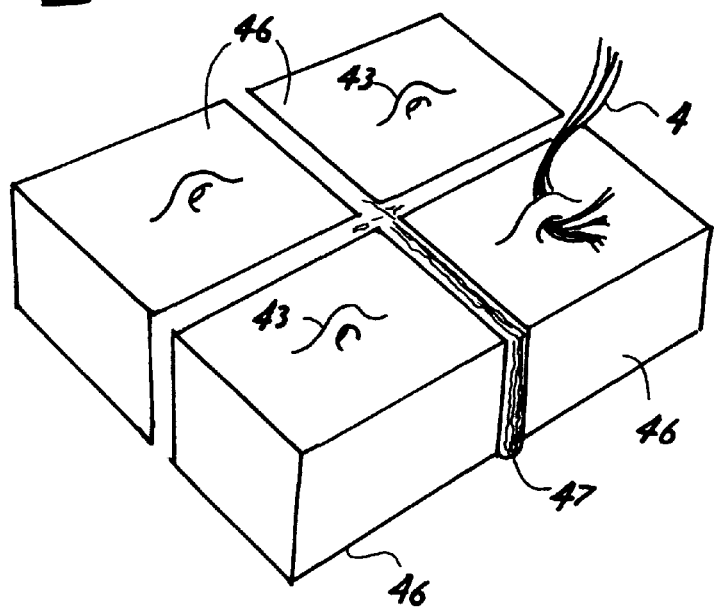
FIG. 26 shows multiple heterogeneous blocks with loops in them as assembled with pre-cured base layer.
Figure 27:
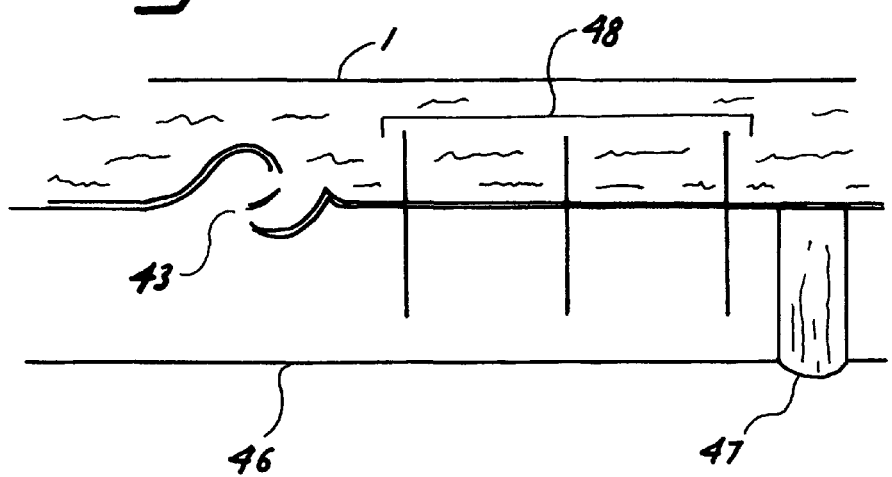
FIG. 27 shows that block assembly after curing.

[FIG. 26] represents a thermal heat barrier that could just as easily be chemical, liner, or explosive ceramic armor assemblies. Insulating, refractory, etc. pre-hardened blocks (46) are wet-sewn to wet layer (or pre-cured in pre-fired ceramic), (1) in [FIG. 27], sewn and held there by loops, knobs, etc. in the blocks (43). The blocks can be pre-hardened composite, cast or fabricated heterogeneous material i.e. metallic, and may employ a grouting material (47) if need be. When heat is applied (49), blocks (46) expand [FIG. 28] as shown by graduations (48a) compared to those while cooled (48) in [FIG. 27] and grouted joint (47) is pinched tighter.

ALTERNATIVE EMBODIMENT #5

Figure 25:
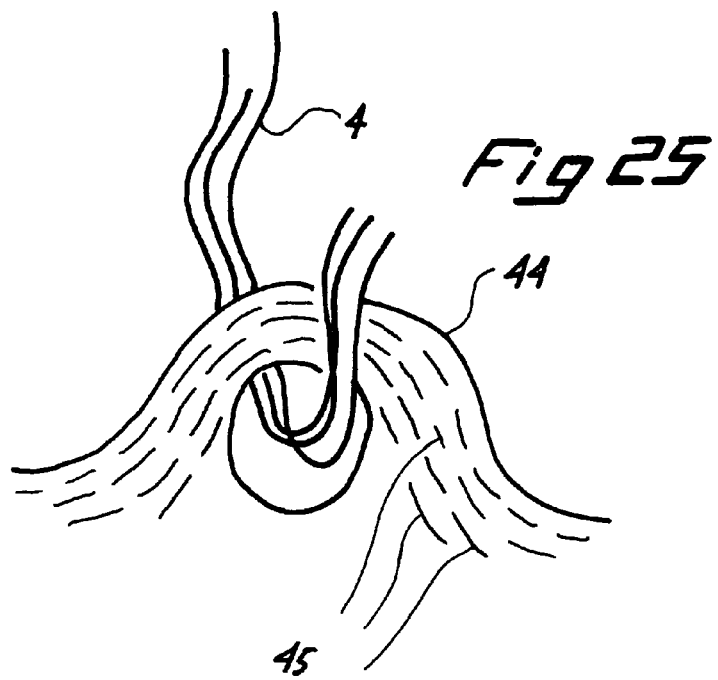
FIG. 25 shows detail of loop.

[FIG. 29] represents the similar condition of a thermal, chemical, armor etc., of [FIG. 25] except a reversal where already-hard base-surface (1) with loops, knobs etc. (43) in it, and has pre-cured (wetted) blocks, tiles, plates, etc. (46a) laminated, laminated-cast, laid down as prefab blanketing, etc. against it where the pre-cured laminate components are attached by sewing through the loops (43) of the dry surface with impregnated pre-cured tow, and thus bonded/locked mechanically upon setting or curing of blocks, tiles, blanket, etc. (46a).

ALTERNATE EMBODIMENT #6

Resistance to sheering de-lamination by embroidered laminating with pre-cured tow and pre-cured layers can be demonstrated with expanding blocks (46) of heat barrier similar to that of [FIGS. 26,27,28, 29] except wherein looping is done similar in manner to that in [FIG. 18], and wherein the types of fibers holding on tile, block, plate, etc. (46) range (like in [FIG. 18,20,21 ]) from stiff connections at the center (32a) in [FIG. 30], through medium-stiff connections (31a) midrange to more flexible connections (30a) outboard near the edge of said plate, tile, block, etc. (46), and with each embroidered tow, especially those in farther out zones (30a), and (31a) are thoroughly impregnated and immediately surrounded with substantially ductile, elastic or somewhat rubberized matrices (50) and (51) respectively. wherein resin is allowed to shift as sheer takes place when block, tile, plate expands faster than said base layer (1), and where outermost fibers are of type that flexes the most, mid range fibers flex less, but are stronger, and so on.

ALTERNATE EMBODIMENT #7

[FIG. 31] represents an ablative heat shield application which uses progressive laminates like in [FIG. 10] and [FIG. 24], such as may be found in a nose of a super sonic vehicle, re-entry vehicle, rocket motor lining or the like. This system could just as easily be applied to sacrificial chemical or armor impact barrier or the like. The composition or system of progressive lamination/embroidery is assembled as in [FIG. 10] or [FIG. 24] wherein base layer (1), or heterogeneous base layer (42) respectively, is progressively laminated to layers (10, 11, 12, 13, 14) as in [FIG. 10] wherein base layer (1) is a structural layer, and subsequent progressively embroidered layers (10-14) include sacrificial thermal matrices that react slowly, i.e. non catastrophically, but sacrificially (13a) in

[FIG. 31] in spite of their being burned off under heat (49), but still insulate structural base layer (1) so that base layer (1) as well as everything beyond including inner layers (12, 11, 10, 4c, 4b, 4a) remains cool and still serviceable and retains structure. Even as outer layers (14) in [FIG. 10] are gone [FIG. 31], the rest of the remaining sacrificial shield (10,11, 12) (in [FIG. 31]) is still secured to the base (1), 42 in [FIG. 31] by remaining embroider paths (4a, 4b, 4c) while heat (chemical, impact, etc.) (49) effects continue to be absorbed by remaining sacrificial layers (10,11,12,13).

ALTERNATE EMBODIMENT #8

Figure 32:
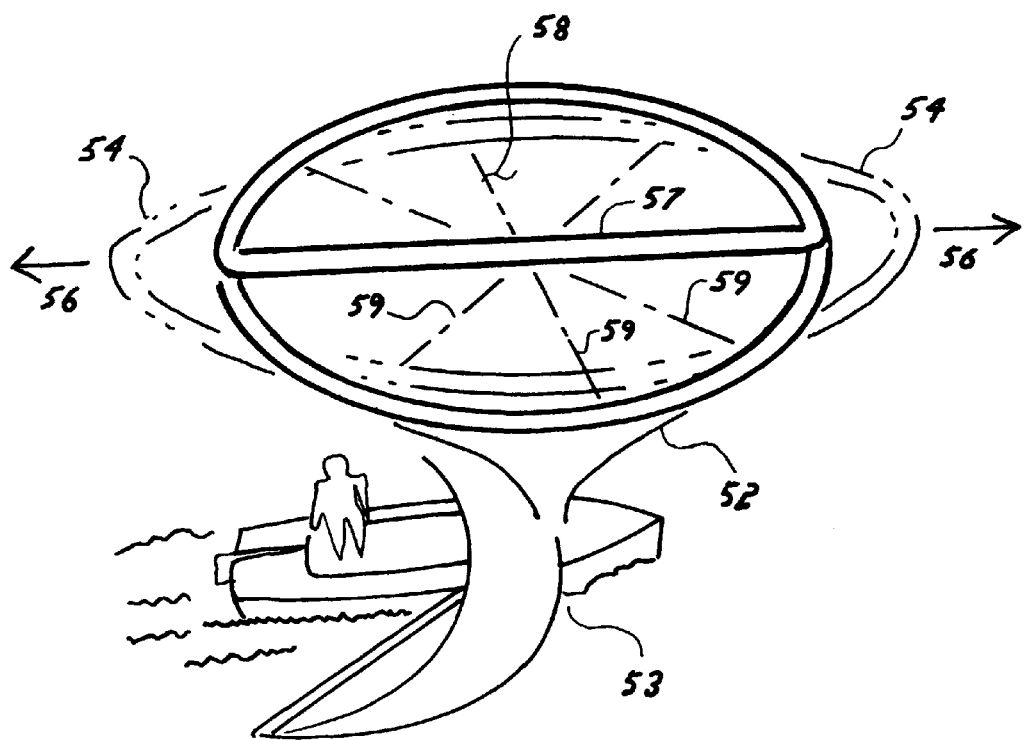
FIG. 32 shows braided pultrusion or filament winding as strengthened by embroidery.

In [FIG. 32], an improvement in strength is shown in braided pultrousions, filament windings and the like adding to their resistance in buckling wherein a round sectioned tube that serves as a pole or mast (52), but could as easily be a wing spar, etc. is bent to "starboard" in sailboat (53). While in bending, the sections would want to deform as shown in (54), where for and aft points would want to advance (55) and (56) respectively. They are prevented from doing so by embroidered fibers under tensile (57) that reach from "forward" part of section to "aft" across foam, hollow threshold, or the like (58), and wherein embroidered fiber (57) can be joined by many others (59) in many directions as need be to strengthen mast pole, etc (52) from collapse in those directions.

ALTERNATIVE EMBODIMENT #9

Figure 33:
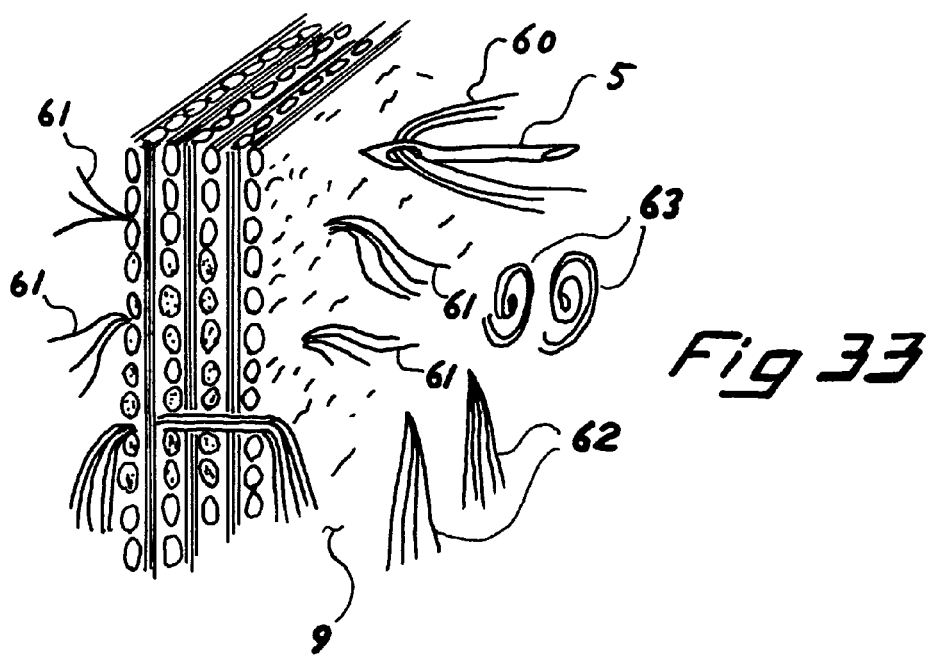
FIG. 33 shows assembly of using tassels that are embroidered.
Figure 34:
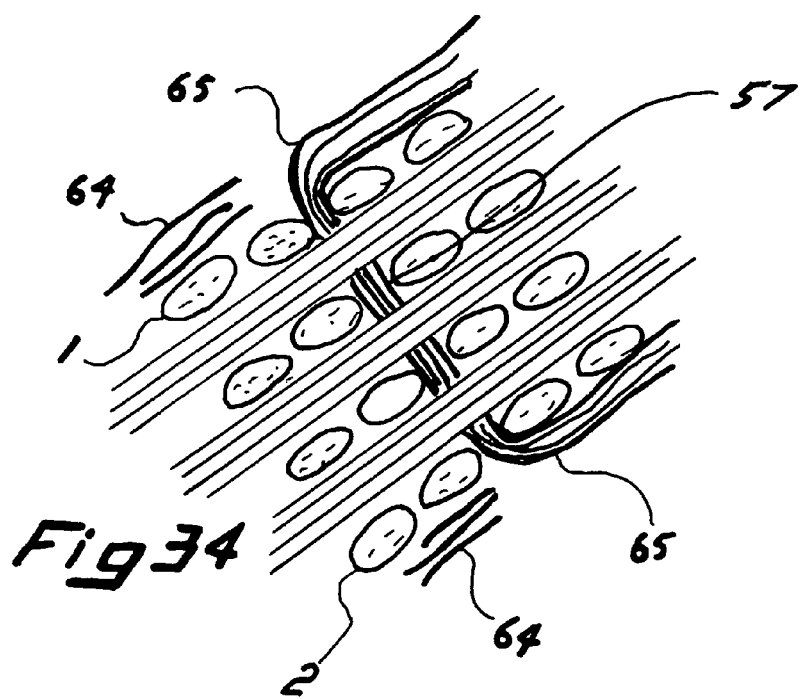
FIG. 34 shows section of that assembly after curing.

A method of embroidering broken segments of pre-cured tow on pre-cured laminate is shown in [FIG. 33] wherein impregnated short lengths of tow are cut to tassels (60) and perforated through or sent through the laminate (9) such that they stick out on both sides (61) and are numerous enough to be a fringe. Before curing, they are either combed straight (62) or formed to coils (63), or the like, such that when they are cured, they become a layer of substantially parallel fibers forming new outer layer (64) in [FIG. 34] while sharp bend in cured tow (65) locks inner and outer layers (1, 2) together held there by tow in tension (57).

I claim:
1. A process of laminating composites comprising:
two or more layers of wet out resin-impregnated or otherwise matrix-aggregated/impregnated pre-cured tow groupings of fiber reinforcement,
wherein a piercing method including penetrating means is undertaken and wherein said penetrating means penetrates
through both or more said layers with also-wet (also matrix-aggregated/impregnated) pre-cured tow,
wherein there is
a means of processing said two or more layers of laminate together by any of the group of processes that includes needle point, embroidery, sewing, stitching, tying, bundling, wrapping, bundle tying, combinations of these,
wherein said also-wet tow that is used to penetrate both or more said layers of laminate and process said layers together is thick enough and wet enough to otherwise be too thick to have been wet out in the pass that wet out one or more of said layers of laminate along with said tow,
wherein both layers are locked by reinforced fibers once the laminate becomes cured or set,
wherein once cured, said layers are locked by virtue of said cured tow looping through said two layers, as well as by optional additional virtue of said tow physically tying said two layers together,
wherein said fiber reinforcement groupings are composed of types of reinforcement represented by the group that includes blanket, matt, cloth, roving, veil, chop, yarn, pultrusion, fabmat, weave, tape, continuous roving, continuous strand, unidirectional tape, single or multiple tows, yarns, multiple filament, multiple strand,
wherein said tow represents one or more strands of reinforcing fibers represented by the group that includes fiber, filament, fiber or filament bundle, yarn,
wherein said also-wet tow that is used to penetrate both or more said layers of laminate and process said layers together provides for a mechanical lock after said matrix is set, cured, dried, and wherein said lock is achieved by reinforcing fibers,
wherein two or more layers or parts of a laminate are embroidered, sewn, tied or otherwise needle pointed wherein said layers or parts are joined together by said tow in addition to glue strength of said matrix,
wherein said joining provides fiber based strength in the substantially normal or Z direction (while said laminate without wet-embroidering may have had only strength in the XY direction and depend on the glue strength of the resin for strength in the Z direction),
wherein the reinforcing fibers holding said layers of lamination together would counter and resist against peel, sheer, de-lamination far greater than that peel, sheer, de-lamination provided by glue-strength of matrix alone,
wherein differing layers of a laminate that are embroidered, sewn, tied, wrapped, bundle tied, or otherwise penetrated or needle pointed can be optionally homogeneous; i.e. where any or all can be substantially of the same type of composite,
wherein differing layers of a laminate are that are embroidered, sewn, tied, wrapped, bundle tied, or otherwise penetrated or needle pointed can be optionally substantially heterogeneous, i.e. of differing physical, mechanical, chemical, thermodynamic, properties, or of differing resins/matrices, or differing fibers, and wherein said tow that pierces said layers of lamination can be optionally heterogeneous as well,
whereby tensile strength between laminate layers is improved over the glue strength of resin alone,
whereby the peel strength is improved between laminate layers over the glue strength of resin alone,
whereby rip tear strength between the laminate layers is improved over glue strength of resin/matrix alone.
2. The matrix/fiber combination of claim 1 wherein said layers may be heterogeneous, and may include types of objects or items represented by the group that includes assemblies, inclusions, hollow spaces, voids, manifolds, encasements, capsules, encapsulations, that can be embroidered, sewn, tied, wrapped, bundle tied, or otherwise penetrated or needle pointed into said laminate though they may be of differing physical, chemical, thermodynamic, variably expansive properties,
wherein said heterogeneous objects or items are locked into laminates by said also-wet tow that is used to penetrate both or more said layers of laminate and process said layers together after said matrix is set, cured, dried, and wherein said lock is achieved by reinforcing fibers,
wherein said heterogeneous objects or items, spaces, manifolds can be encapsulated into said laminates as inclusions.
3. The combination of claim 2 wherein said heterogeneous object or item is a cured layer of laminate.

4. The matrix fiber combination of claim 2 wherein the heterogeneous item is represented by part of a group that includes sandwiching material, sandwiching material that is pierced, sandwiching material that cures along with the rest of the laminate, foams, fillers, wherein when embroidering with layers with said foam or said sandwich material, stitching can pierce all the way through the sandwiching material, or stitching can surmount said sandwiching material, or stitching can be introduced through openings in said sandwiching material, wherein sandwich includes option of being pre cured, wherein sandwich includes option of comprising of a sandwich to be wet/laid, wherein there is an option for the sandwich to be introduced as a heterogeneous item or object.

5. The matrix/fiber combination of claim 2 wherein said inclusion encapsulation is performed by said also-wet tow (and said subsequent fiber reinforcement) through said wet pre-cured laminate layer across parting lines between layers as necessary for said encapsulation and inclusion, wherein there is minimal strength loss across said parting line, wherein there is increased rip/tear strength across said parting line, wherein there is increased peel strength across said parting line over peel strength of matrix/resin alone, wherein there is increased tensile strength across said parting line over tensile strength/glue strength of resin/matrix alone.

6. The matrix fiber combination of claim 1 wherein laminates are progressively embroidered from one layer to other layers of the laminate, wherein progressively embroidered is defined by any member of the group that includes:

A. progressively stitching layers from one layer to the next,

B. stitching multiple layers progressively from a base layer or base layer group to each subsequent layer individually, C. stitching a single layer or a group of layers to a group of jointly or progressively stitched layers, 4. stitching a single layer or group of layers to a group of jointly or progressively stitched layers, special laminates, special objects, voids, or so on.

7. The matrix/fiber combination of claim 6 wherein said also-wet tow (of claim 1) having pierced multiple layers of laminate holds on successive layers (after curing) that are intended be sacrificial under the group of conditions that is represented by abrasion, melting, sublimating, dissolving, etching, ablative, burning-off, corrosion, gas-off, chemical reaction, mechanical degradation, fissures, cracks, crazes, wherein the odds can be increased for protection against sudden catastrophic failure, that could result from the group of conditions that include abrasion, melting, sublimating, dissolving, etching, ablative, burning-off, corrosion, gas-off, chemical reaction, mechanical degradation, fissures, cracks, crazes, of presently outer layers of matrix and reinforcement, wherein there can be structural symbiosis wherein the base structure provides for mechanical strength and outer layers provide for protective featuring against failure wherein mechanical/structural strength alone of outer layers otherwise would not be strong enough.

8. The progressively embroidered laminate of claim 6 wherein successive layers may include layers purposefully heterogeneous in performance characteristics, wherein they are all processed to said base layer, wherein said process from said base layer to said progressive successive layer can be any of the group of processes that includes needle point, embroidery, sewing, stitching, tying, bundling, wrapping, bundle tying, combinations of these, wherein while outermost layers degrade, inner ones closer to the base layer remain independently embroidered thereby retaining the rest of the deliberately sacrificial layer to the base layer, wherein degradation of said sacrificial layer can be any process from the group of sacrificial processes that include abrasion, melting, sublimating, dissolving, etching, ablative, burning-off, corrosion, gas-off, chemical reaction, mechanical degradation, fissures, cracks, crazes, wherein said degradation can be a gradual process as opposed to a sudden catastrophic failure.

9. The matrix/fiber combination of claim 1 wherein said embroidering, sewing, tying, wrapping, bundle tying, or otherwise penetrating or needle pointing, piercing, process can be performed before or during or after or during combinations of those stages of other typical composite laminating processes, wherein said processes are represented by the group that includes thermoplastics, thermoset plastics, open molding, vacuum bagging, pultrusioun, braided pultrusions, thermoresin cooling, prepreg, thaw curing (i.e. heat change ending to STP Standard Temperature and Pressure), heat curing (i.e. starting from STP), filament winding, tape winding, wrapping, compression molding, compression laminating, RIM, RTM, pressure forming, combinations of these, wherein those processes or forms/products from those processes may be further strengthened.

10. The matrix fiber combination of claim 1 wherein said also-wet tow that holds said layers of lamination together is heterogeneous, wherein said fiber is different, or said resin/matrix is different, or both resin/matrix and fiber are different, wherein said strength in the normal or "Z" direction which increases the holding forces between said layers of lamination (due to reinforcement) over that of the glue-strength of the resin/matrix alone can also have the added properties of the group of properties that includes toughness, ductility, flexibility, elongation, elasticity, wherein sheer may be counteracted, i.e. between layers of laminate that may have differing expansion rates, wherein peel may be counteracted, i.e. by holding together by virtue of elongation, elasticity, flexibility while background composite under normal forces may be more brittle or stiff, wherein sudden catastrophic failure may be counteracted by not all the fibers of the normal or "Z" direction giving out substantially at once.

11. The matrix fiber combination of claim 1 wherein different combinations of resin/matrix may be used in said also-wet tow that holds together said layers of laminate, as well as different combinations of resin/matrix in the background laminate near the immediate vicinity of said also-wet tow, wherein said resin/matrix surrounding said also-wet tow provides for more elasticity, wherein said also-wet tow may or may not be more elastic or have more elongation, wherein once said laminate cures, any relative motion between said layers of laminate due to differing expansion rates will provide for minimum sheering forces on said reinforcement in normal or "Z" direction, wherein failure due to sheer may be counteracted,
wherein failure of said reinforcement in the normal or "Z" direction can be managed to occur incrementally and wherein sudden catastrophic failure of said reinforcement in normal or "Z" direction may be counteracted.

12. The matrix fiber combination of claim 1 including using said also-wet tow to sew a wet layer of lamination into looping means in homogeneous or heterogeneous already-cured base material.

13. The matrix fiber combination of claim 12 while said already-cured base material items form the representative group that includes blocks, tiles, plates, objects, items containing looping means,
  wherein said objects or items can expand or contract and still remain mechanically connected to said base layer in spite of sheer, and/or differing rates of expansion/contraction between layers of laminate,
  whereby expansion/contraction cycles or different expansion/contraction rates between layers of laminate would not cause an otherwise sheer failure in adhesive or cohesive glue strength.

14. The claim of 12 except the reverse, wherein said base material includes already-cured laminate wherein said looping means includes tow/fibers,
  wherein said looping tow/fibers is/are anchored into said base material/laminate by having been processed by a type of process from the group that includes needle point, embroidery, sewing, stitching, tying, bundling, wrapping, bundle tying, combinations of these,
  wherein fabrication takes place of homogeneous or heterogeneous next layer of the material items form the representative group that includes blocks, tiles, plates, objects, items containing looping means, castings, pourings, lamination layers, skins, splashes, lamination layers that include sewn anchored looping means.

15. The matrix/fiber combination of claim 1 wherein matrices/resin are one of the group that includes:
  A. thermoset plastic resin
  B. thermoplastic resin
  C. prepreg (pre-impregnated) thermoset plastic resin
  D. heat-welded thermoplastic resin in the form of liquid, pellets, dust
  E. pre-fired ceramic processed material
  F. pre-cured, pre-dried masonry material
  G. Combinations of these.

* * * * *